(12) United States Patent
Kondo et al.

(10) Patent No.: US 11,835,748 B2
(45) Date of Patent: Dec. 5, 2023

(54) PLANAR LIGHT SOURCE AND DISPLAY DEVICE

(71) Applicant: NICHIA CORPORATION, Anan (JP)

(72) Inventors: Shinya Kondo, Itano-gun (JP); Takuya Nakabayashi, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/866,678

(22) Filed: Jul. 18, 2022

(65) Prior Publication Data

US 2023/0025627 A1   Jan. 26, 2023

(30) Foreign Application Priority Data

Jul. 19, 2021 (JP) .................................. 2021-118622

(51) Int. Cl.
*G02F 1/1335* (2006.01)
*F21V 8/00* (2006.01)
*G02F 1/13357* (2006.01)

(52) U.S. Cl.
CPC ........... *G02B 6/002* (2013.01); *G02B 6/0088* (2013.01); *G02F 1/133603* (2013.01); *G02F 1/133608* (2013.01); *G02F 1/133612* (2021.01)

(58) Field of Classification Search
CPC ......... G02F 1/133345; G02F 1/133308; G02F 1/133608; G02F 1/133314; G02F 1/133311; G02B 6/002; G02B 6/0088; G02B 6/0095

See application file for complete search history.

(56) References Cited

U.S. PATENT DOCUMENTS

| | | | | |
|---|---|---|---|---|
| 2009/0290089 A1* | 11/2009 | Ichioka | ............. | G02F 1/133308 349/58 |
| 2011/0037740 A1* | 2/2011 | Yamaguchi | ....... | G02F 1/133603 362/558 |
| 2011/0194034 A1* | 8/2011 | Shimizu | ............... | G02B 6/0036 348/739 |
| 2014/0092631 A1* | 4/2014 | Fujii | ................. | G02F 1/133608 362/611 |
| 2015/0016090 A1* | 1/2015 | Lee | ................... | G02F 1/133608 362/97.1 |

(Continued)

FOREIGN PATENT DOCUMENTS

| | | |
|---|---|---|
| JP | 2013-012953 A | 1/2013 |
| JP | 2018-101521 A | 6/2018 |

(Continued)

*Primary Examiner* — Zheng Song
(74) *Attorney, Agent, or Firm* — Foley & Lardner LLP

(57) ABSTRACT

A planar light source includes: a support member including a wiring substrate, a light guide member, a light source disposed in a hole of the light guide member, and a first reinforcing member disposed on the support member and surrounding the light guide member in a plan view. The first reinforcing member includes first and second portions extending in a first direction and facing each other, and includes third and fourth portions extending in a second direction orthogonal to the first direction and facing each other. At least one of the first portion, the second portion, the third portion, and the fourth portion has light reflectivity to light emitted from the light source. In the plan view, the light guide member is located between the first and second portions in the second direction, and is located between the third and fourth portions in the first direction.

23 Claims, 16 Drawing Sheets

(56) References Cited

U.S. PATENT DOCUMENTS

| | | | |
|---|---|---|---|
| 2015/0036385 A1* | 2/2015 | Kawai | G02B 6/0088 |
| | | | 362/613 |
| 2016/0282669 A1* | 9/2016 | Lee | G02F 1/133609 |
| 2019/0227382 A1* | 7/2019 | Wanatabe | G02B 6/0051 |
| 2020/0019017 A1* | 1/2020 | Kyoukane | G02F 1/133611 |
| 2020/0049876 A1* | 2/2020 | Wanatabe | G02B 6/0021 |
| 2020/0049877 A1 | 2/2020 | Watanabe et al. | |
| 2020/0105966 A1 | 4/2020 | Sasaoka et al. | |
| 2020/0209460 A1* | 7/2020 | Achi | F21V 5/04 |
| 2020/0209462 A1* | 7/2020 | Kasai | G02F 1/133608 |
| 2020/0285117 A1 | 9/2020 | Hashimoto et al. | |
| 2021/0149251 A1* | 5/2021 | Lee | G02F 1/133605 |
| 2022/0365389 A1* | 11/2022 | Aoki | G02F 1/133626 |

FOREIGN PATENT DOCUMENTS

| | | |
|---|---|---|
| JP | 2020-009556 A | 1/2020 |
| JP | 2020-013714 A | 1/2020 |
| JP | 2020-038760 A | 3/2020 |
| JP | 2020-057595 A | 4/2020 |
| JP | 2020-149966 A | 9/2020 |
| WO | WO-2020/101038 A1 | 5/2020 |

* cited by examiner

PLANAR LIGHT SOURCE AND DISPLAY DEVICE

CROSS-REFERENCE TO RELATED APPLICATION

This application claims priority to Japanese Patent Application No. 2021-118622, filed on Jul. 19, 2021, the disclosure of which is hereby incorporated by reference in its entirety.

BACKGROUND

The present disclosure relates to a planar light source and a display device.

A light-emitting module acquired by combining a light-emitting element such as a light-emitting diode and a light guide plate is widely used in a planar light source such as a backlight for a liquid crystal display device, for example. See, for example Japanese Patent Publication No. 2018-101521.

SUMMARY

As a reduction in thickness of the planar light source advances, a decrease in rigidity is a concern. An object of an embodiment of the present disclosure is to provide a planar light source and a display device in which deformation is suppressed.

According to an embodiment of the present invention, a planar light source includes: a support member including a wiring substrate including a conductive portion; a light guide member having a first surface facing the support member, a second surface located on an opposite side to the first surface, and a hole open to the first surface side; a light source disposed in the hole of the light guide member and electrically connected to the conductive portion; and a first reinforcing member surrounding the light guide member in a plan view, including a first portion and a second portion extending in a first direction and facing each other, a third portion and a fourth portion extending in a second direction orthogonal to the first direction and facing each other, and being disposed on the support member, at least one of the first portion, the second portion, the third portion, and the fourth portion having light reflectivity to light emitted from the light source. In the plan view, the light guide member is located between the first portion and the second portion in the second direction, and is located between the third portion and the fourth portion in the first direction.

According to certain embodiments, a planar light source and a display device can be provided in which deformation is suppressed.

DETAILED DESCRIPTION

Figure 1:
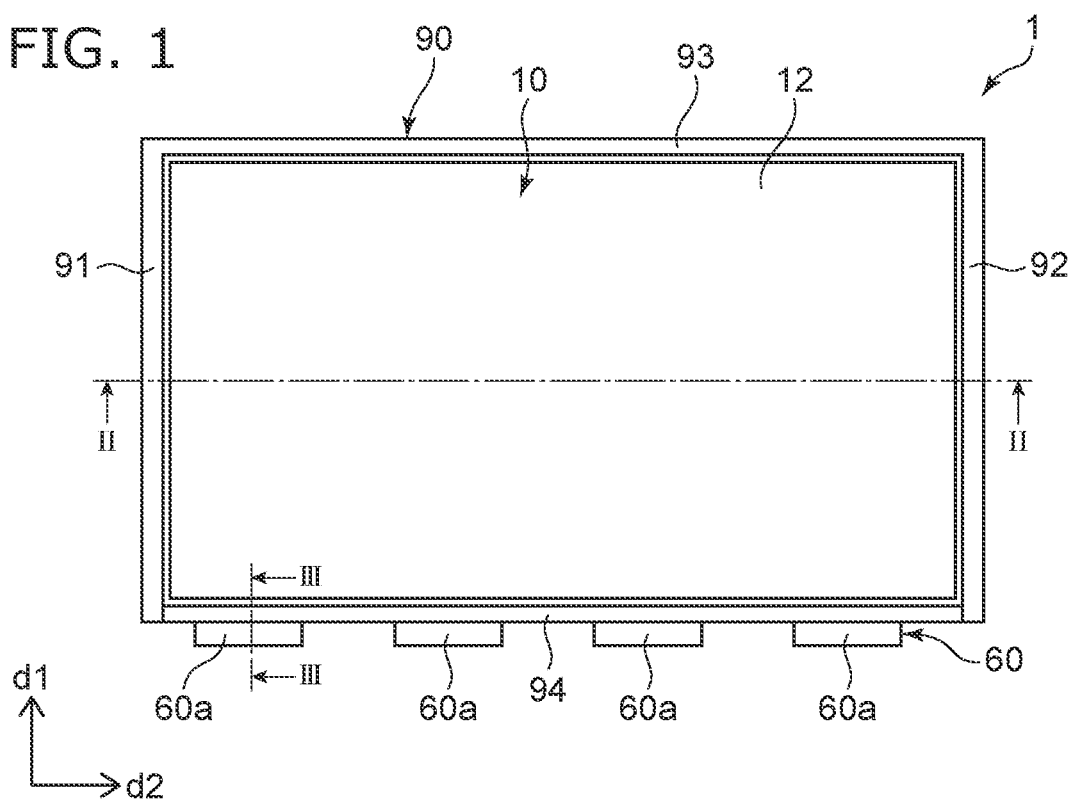
FIG. 1 is a schematic top view of a planar light source according to a first embodiment.

Embodiments will be described below with reference to the drawings. Note that the drawings schematically illustrate the embodiments, and thus scales, intervals, positional relationships, or the like of members may be exaggerated, or illustration of some of the members may be omitted. As a cross-sectional view, an end surface illustrating only a cut surface may be illustrated.

In the following description, components having substantially the same function may be denoted by the same reference characters and a repeated description thereof may be omitted. Further, terms indicating a specific direction or position ("upper", "lower", and other terms related to those terms) may be used. However, these terms are used merely to make it easy to understand relative directions or positions in the referenced drawing. As long as the relative direction or position is the same as that described in the referenced drawing using the term such as "upper" or "lower," in drawings other than the drawings of the present disclosure, actual products, and the like, components need not necessarily be arranged in the same manner as in the referenced drawing. In the present specification, "parallel" includes not only a case in which two straight lines, sides, surfaces, and the like extend without intersecting each other, but also includes a case in which two straight lines, sides, surfaces, and the like intersect each other at an angle formed therebetween within 10°. In the present specification, the term "on" includes a case in which an object is in contact and also a case in which an object is not in contact but located above.

First Embodiment

A planar light source 1 according to a first embodiment will be described with reference to FIGS. 1 to 7D.

The planar light source 1 includes a light guide member 10, a light source 20A, a support member 110, and a first reinforcing member 90.

Hereinafter, each element constituting the planar light source 1 will be described in detail.

Light Guide Member

Figure 5:
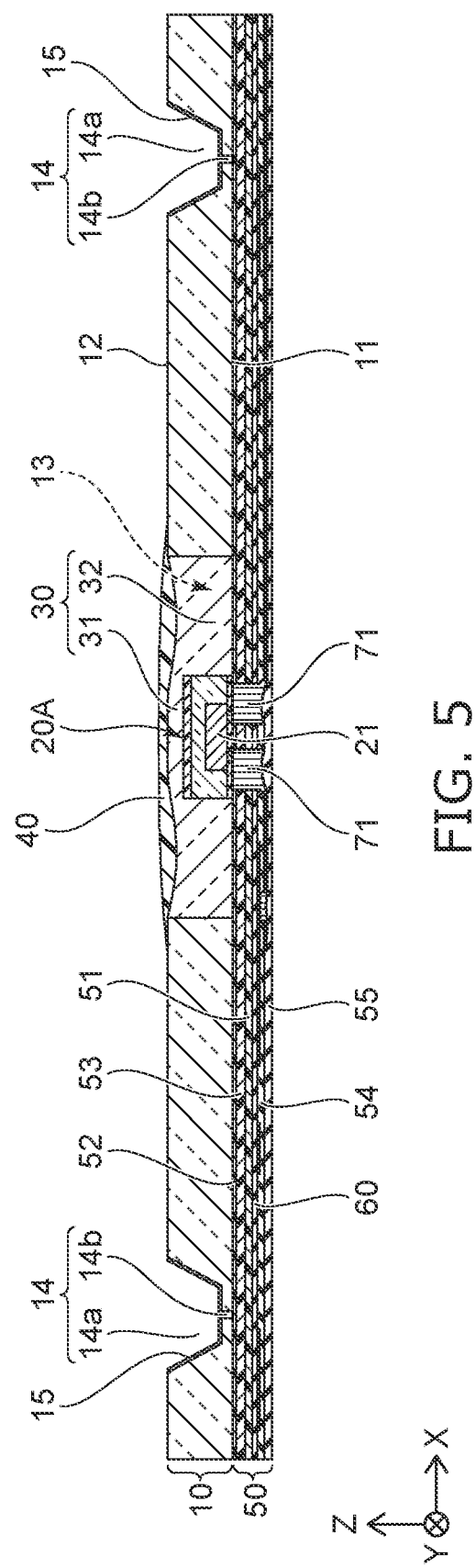
FIG. 5 is a schematic cross-sectional view taken along a line V-V in FIG. 4.

As illustrated in FIG. 5, the light guide member 10 has a first surface 11, and a second surface 12 on an opposite side to the first surface 11. In the present specification, two directions that are parallel to the first surface 11 of the light guide member 10 and are orthogonal to each other are referred to as an X direction and a Y direction. Further, a direction extending from the first surface 11 toward the second surface 12 orthogonal to the X direction and the Y direction is referred to as a Z direction.

Figure 4:
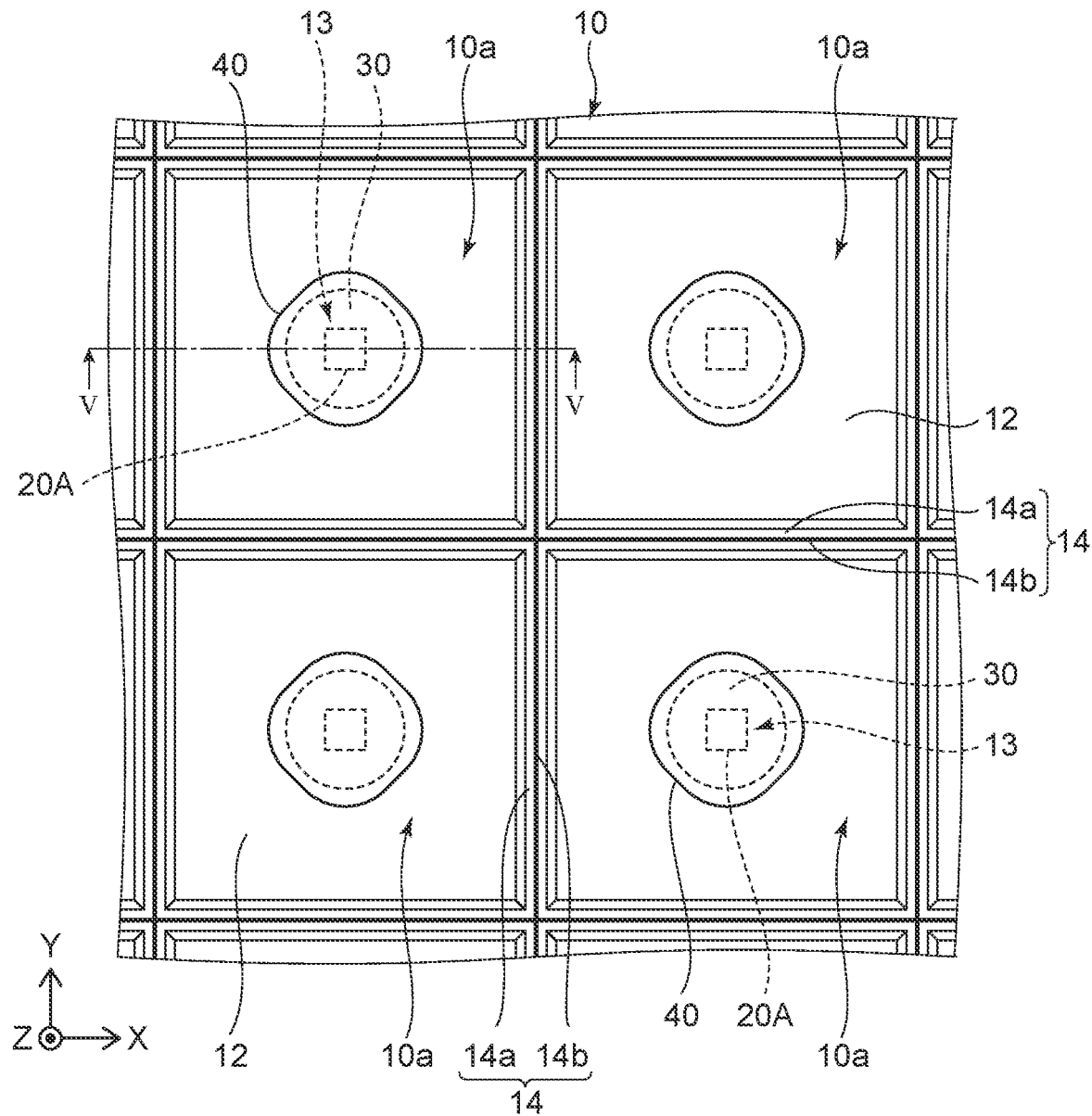
FIG. 4 is a schematic top view of a light guide member according to the embodiments.

As illustrated in FIG. 4, the light guide member 10 includes a plurality of light guide portions 10a. The light guide portions 10a are separated from each other in the X direction and the Y direction by a groove 14 described below. One light guide portion 10a can be, for example, a drive unit of local dimming. Note that, in some embodiments, the light guide member 10 is not separated into the plurality of light guide portions 10a.

The light guide member 10 is light-transmissive to light emitted from the light source 20A. A transmittance of the light guide member 10 with respect to a peak wavelength of the light source 20A is preferably equal to or greater than 50% and more preferably equal to or greater than 70%, for example.

As a material of the light guide member 10, a thermoplastic resin such as acrylic, polycarbonate, cyclic polyolefin, polyethylene terephthalate, or polyester, a thermosetting resin such as epoxy or silicone, or glass can be used, for example.

A thickness of the light guide member 10 is preferably in a range from 150 µm to 800 µm, for example. In the present specification, a thickness of each member represents the maximum value of a distance between an upper surface and a lower surface of each member in the Z direction. The light guide member 10 may be formed of a single layer or may be formed of a layered body of a plurality of layers in the Z direction. When the light guide member 10 is formed of a layered body, a light-transmissive adhesive member may be disposed between layers. The layers of the layered body may use different kinds of chief materials. As a material of the adhesive member, a thermoplastic resin such as acrylic, polycarbonate, cyclic polyolefin, polyethylene terephthalate, or polyester, or a thermosetting resin such as epoxy or silicone can be used, for example.

The light guide member 10 has a hole 13 penetrating from the first surface 11 to the second surface 12. The light guide member 10 has a plurality of holes 13. For example, one hole 13 is disposed in each of the plurality of light guide portions 10a. As illustrated in FIG. 4, the shape of the hole 13 can be, for example, a circle in a top view. Further, the shape of the hole 13 can be, for example, an ellipse, or a polygon such as a triangle, a quadrilateral, a hexagon, or an octagon in the top view.

The groove 14 that separates the light guide portions 10a from each other is formed in the light guide member 10. As illustrated in FIG. 4, the groove 14 extends in the X direction and the Y direction in the top view. As illustrated in FIG. 5, the groove 14 includes a first groove portion 14a that is open to the second surface 12 side, and a second groove portion 14b that is open to the first surface 11 side. The first groove portion 14a and the second groove portion 14b are connected to each other in the Z direction. A width of the first groove portion 14a is greater than a width of the second groove portion 14b. The width of the first groove portion 14a and the width of the second groove portion 14b are a width in a direction orthogonal to a direction in which the groove 14 is elongated.

As illustrated in FIG. 5, a partition member 15 can be disposed in the first groove portion 14a. The partition member 15 has light reflectivity to the light emitted from the light source 20A. The partition member 15 is, for example, a resin member containing light scattering particles. As the light scattering particles of the partition member 15, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example. As a resin material of the partition member 15, a thermoplastic resin such as an acrylic resin, a polycarbonate resin, a cyclic polyolefin resin, a polyethylene terephthalate resin, or a polyester resin, or a thermosetting resin such as an epoxy resin or a silicone resin can be used, for example. The partition member 15 may be a metal member made of, for example, aluminum or silver. For example, the partition member 15 is disposed in a film shape along an inside surface of the first groove portion 14a. The partition member 15 may fill the first groove portion 14a.

The partition member 15 suppresses light propagation between the adjacent light guide portions 10a. For example, light propagation from the light guide portion 10a in a light emission state to the light guide portion 10a in a non-light emission state is limited by the partition member 15. In this way, local dimming with each of the light guide portions 10a as a drive unit can be achieved.

In FIG. 5, the groove 14 penetrates from the first surface 11 to the second surface 12 of the light guide member 10. The groove 14 may be a bottomed groove having an opening on the second surface 12 side, and having a bottom that does not reach the first surface 11. The groove 14 may be a bottomed groove having an opening on the first surface 11 side, and having a bottom that does not reach the second surface 12. The groove 14 may be a hollow groove provided inside the light guide member 10.

Light Source

The light source 20A is disposed in the hole 13 of the light guide member 10. The light source 20A is disposed in each of the plurality of holes 13. The hole 13 in which the light source 20A is disposed is not limited to a through hole, and may be a recessed portion that is open to the first surface 11 side.

The light source 20A includes a light-emitting element 21. The light-emitting element 21 includes a semiconductor layered body. The semiconductor layered body includes, for example, a substrate such as sapphire or gallium nitride, an n-type semiconductor layer disposed on the substrate, a p-type semiconductor layer, and a light-emitting layer sandwiched therebetween. Further, the light-emitting element 21 includes an n-side electrode electrically connected to the n-type semiconductor layer, and a p-side electrode electrically connected to the p-type semiconductor layer. Furthermore, the light source 20A includes a pair of positive and negative electrodes 25 disposed on a lower surface side. One of the pair of electrodes 25 is electrically connected to the p-side electrode, and the other is electrically connected to the n-side electrode.

The semiconductor layered body from which the substrate is eliminated may be used. Further, a structure of the light-emitting layer may be a structure including a single active layer such as a double heterostructure and a single quantum well (SQW) structure, or a structure including an active layer group such as a multiple quantum well (MQW) structure. The light-emitting layer can emit visible light or ultraviolet light. The light-emitting layer can emit light as visible light from blue to red. As the semiconductor layered body including such a light-emitting layer, for example, $In_xAl_yGa_{1-x-y}N$ ($0 \le x$, $0 \le y$, $x+y \le 1$) can be included. The semiconductor layered body can include at least one light-emitting layer that can achieve the light emission described above. For example, the semiconductor layered body may have a structure including one or more light-emitting layers between the n-type semiconductor layer and the p-type semiconductor layer, or may have a structure in which a structure including the n-type semiconductor layer, the light-emitting layer, and the p-type semiconductor layer in order is repeated multiple times. When the semiconductor layered body includes the plurality of light-emitting layers, the semiconductor layered body may include the light-emitting layers having different light emission peak wavelengths, or may include the light-emitting layers having the same light emission peak wavelength. Note that the same light emission peak wavelength may have a variation of approximately several nm, for example. A combination of such light-emitting layers can be selected as appropriate, and, for example, when the semiconductor layered body includes two light-emitting layers, the light-emitting layers can be selected from combinations of blue light and blue light, green light and green light, red light and red light, ultraviolet light and ultraviolet light, blue light and green light, blue light and red light, green light and red light, and the like. The light-emitting layer may include a plurality of active layers having different light emission peak wavelengths, or may include a plurality of active layers having the same light emission peak wavelength.

Figure 6:
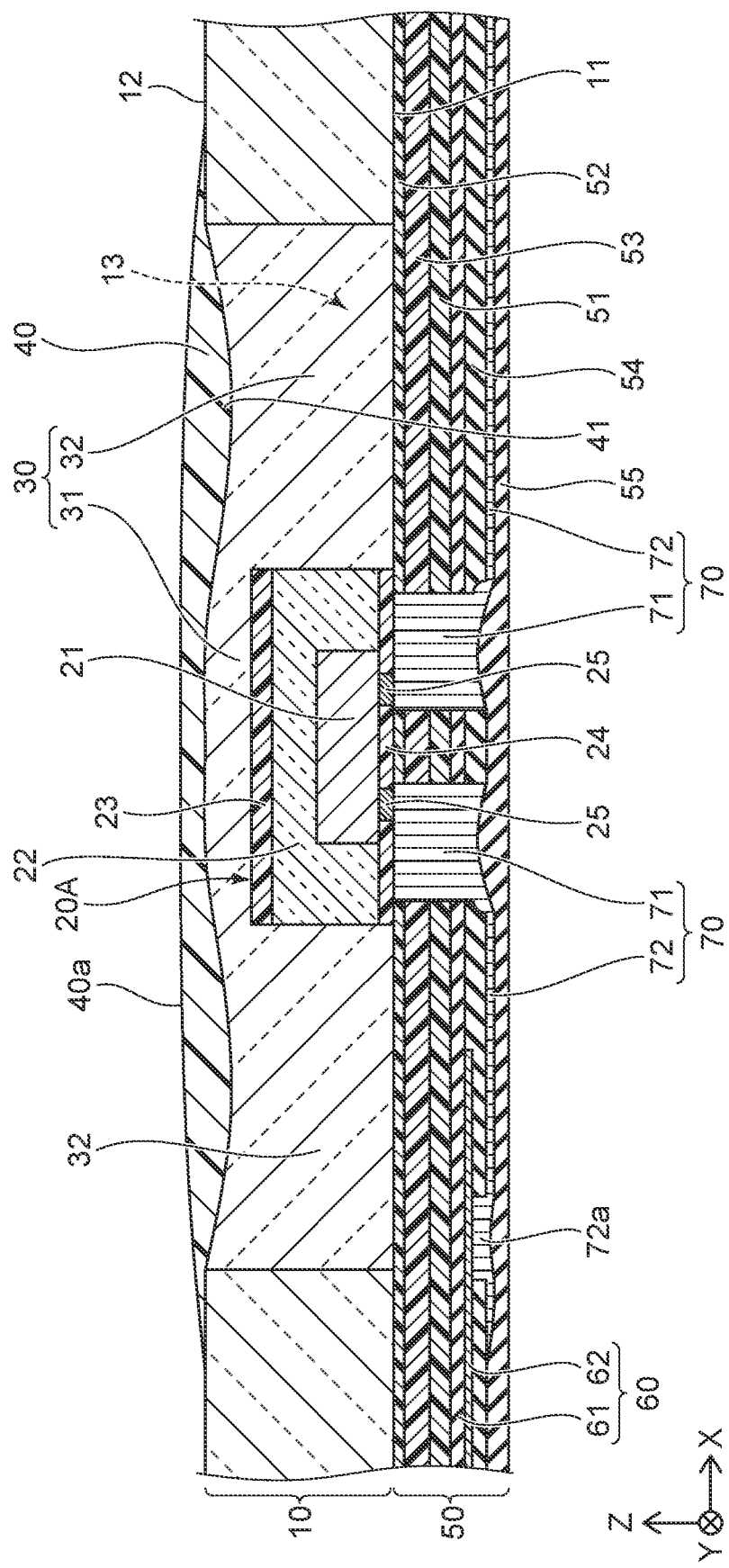
FIG. 6 is a schematic cross-sectional view illustrating a light source and surroundings thereof in FIG. 5.
Figure 7A:
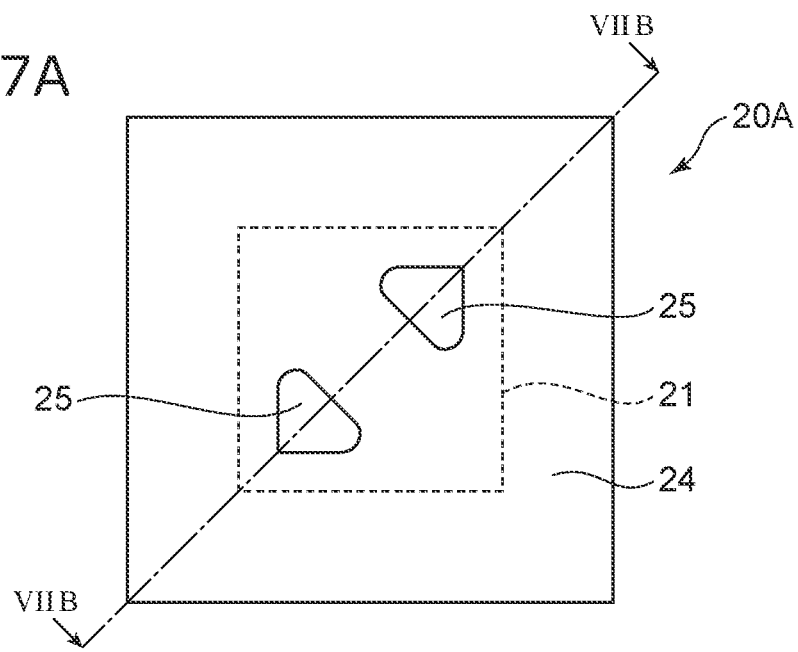
FIG. 7A is a schematic bottom view of a light source according to each embodiment.
Figure 7B:
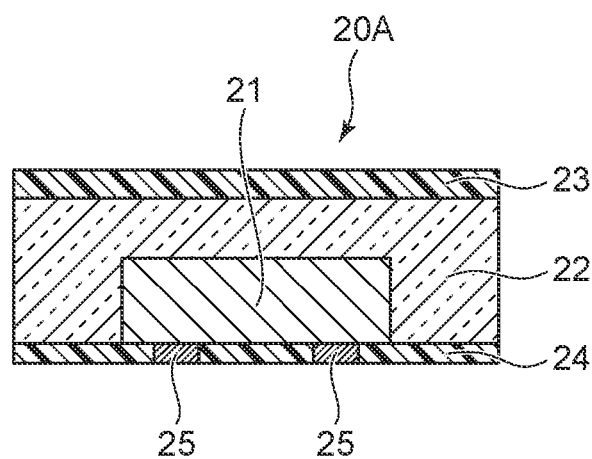
FIG. 7B is a schematic cross-sectional view taken along a line VIIB-VIIB in FIG. 7A.
Figure 7C:
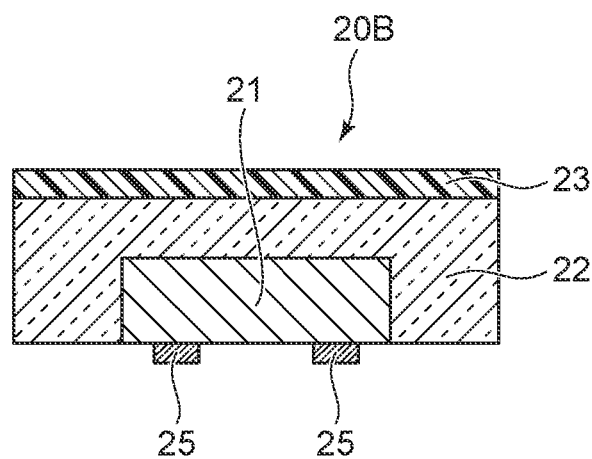
FIG. 7C is a schematic cross-sectional view illustrating a modified example of the light source according to the embodiments.

As illustrated in FIGS. 6 to 7B, the light source 20A can further include a second light-transmissive member 22. The second light-transmissive member 22 covers an upper surface and a lateral surface of the light-emitting element 21. The second light-transmissive member 22 protects the light-emitting element 21, and also has functions such as wavelength conversion and light diffusion according to particles added to the second light-transmissive member 22.

For example, the second light-transmissive member 22 contains a light-transmissive resin, and may further contains a phosphor. For example, a silicone resin, an epoxy resin, or the like can be used as the light-transmissive resin. Further, as the phosphor, an yttrium aluminum garnet based phosphor (for example, $Y_3(Al,Ga)_5O_{12}$:Ce), a lutetium aluminum garnet based phosphor (for example, $Lu_3(Al,Ga)_5O_{12}$:Ce), a terbium aluminum garnet based phosphor (for example, $Tb_3(Al,Ga)_5O_{12}$:Ce), a CCA based phosphor (for example, $Ca_{10}(PO_4)_6Cl_2$:Eu), an SAE based phosphor (for example, $Sr_4Al_{14}O_{25}$:Eu), a chlorosilicate based phosphor (for example, $Ca_8MgSi_4O_{16}Cl_2$:Eu), a β-SiAlON based phosphor (for example, $(Si,Al)_3(O,N)_4$:Eu), an α-SiAlON based phosphor (for example, $Ca(Si,Al)_{12}(O,N)_{16}$:Eu), an SLA based phosphor (for example, $SrLiAl_3N_4$:Eu), a nitride based phosphor such as a CASN based phosphor (for example, $CaAlSiN_3$:Eu) or an SCASN based phosphor (for example, $(Sr,Ca)AlSiN_3$:Eu), a fluoride phosphor such as a KSF based phosphor (for example, $K_2SiF_6$:Mn), a KSAF based phosphor (for example, $K_2Si_{0.99}Al_{0.01}F_{5.99}$:Mn), or an MGF based phosphor (for example, $3.5MgO\cdot0.5MgF_2\cdot GeO_2$:Mn), a phosphor having a perovskite structure (for example, $CsPb(F,Cl,Br,I)_3$), a quantum dot phosphor (for example, CdSe, InP, $AgInS_2$, or $AgInSe_2$), or the like can be used. As the phosphor added to the second light-transmissive member 22, one kind of a phosphor may be used, or a plurality of kinds of phosphors may be used.

The KSAF based phosphor may have a composition represented by Formula (I) below.

$$M_2[Si_pAl_qMn_rF_s] \quad (I)$$

In Formula (I), M represents an alkali metal and may include at least K. Mn may be a tetravalent Mn ion. p, q, r, and s may satisfy $0.9 \le p+q+r \le 1.1$, $0 < q \le 0.1$, $0 < r \le 0.2$, $5.9 \le s \le 6.1$. Preferably $0.95 \le p+q+r \le 1.05$ or $0.97 \le p+q+r \le 1.03$, $0 < q \le 0.03$, $0.002 \le q \le 0.02$ or $0.003 \le q \le 0.015$, $0.005 \le r \le 0.15$, $0.01 \le r \le 0.12$ or $0.015 \le r \le 0.1$, $5.92 \le s \le 6.05$ or $5.95 \le s \le 6.025$. Examples thereof include compositions represented by $K_2[Si_{0.946}Al_{0.005}Mn_{0.049}F_{5.995}]$, $K_2[Si_{0.942}Al_{0.008}Mn_{0.050}F_{5.992}]$, $K_2[Si_{0.939}Al_{0.014}Mn_{0.047}F_{5.986}]$. According to such a KSAF based phosphor, it is possible to obtain red light emission having a high luminance and a narrow half-value width of the light emission peak wavelength.

Further, a wavelength conversion sheet containing the phosphor described above may be disposed on the planar light source 1. Because the wavelength conversion sheet absorbs some of blue light from the light source 20A and emits yellow light, green light, and/or red light, the planar light source 1 that emits white light can be achieved. For example, white light can be acquired by combining the light source 20A that can emit blue light and the wavelength conversion sheet containing the phosphor that can emit yellow light. In addition, the light source 20A that can emit blue light and the wavelength conversion sheet containing a red phosphor and a green phosphor may be combined. Further, the light source 20A that can emit blue light and a plurality of wavelength conversion sheets may be combined. As the plurality of wavelength conversion sheets, for example, the wavelength conversion sheet containing the phosphor that can emit red light and the wavelength conversion sheet containing the phosphor that can emit green light can be selected. Further, the light source 20A including the light-emitting element 21 that can emit blue light and the second light-transmissive member 22 containing the phosphor that can emit red light may be combined with the wavelength conversion sheet containing the phosphor that can emit green light.

As a yellow phosphor used in the wavelength conversion sheet, the yttrium aluminum garnet based phosphor is preferably used, for example. Further, as a green phosphor used in the wavelength conversion sheet, for example, the phosphor having the perovskite structure or the quantum dot phosphor described above with a narrow half-value width of a light emission peak wavelength is preferably used. Further, as a red phosphor used in the wavelength conversion sheet, for example, the KSF based phosphor, the KSAF based phosphor, or the quantum dot phosphor described above with a narrow half-value width of a light emission peak wavelength is preferably used, similarly to the green phosphor.

The light source 20A can further include a covering member 24. The covering member 24 is disposed on a lower surface of the light-emitting element 21. The covering member 24 is disposed such that a lower surface of the electrodes 25 of the light source 20A is exposed from the covering member 24. The covering member 24 is also disposed on a lower surface of the second light-transmissive member 22 covering the lateral surface of the light-emitting element 21.

The covering member 24 has light reflectivity to the light emitted from the light source 20A. The covering member 24 is, for example, a resin member containing a light reflective substance. As the light reflective substance of the covering member 24, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example. As a resin material of the covering member 24, a thermoplastic resin such as an acrylic resin, a polycarbonate resin, a cyclic polyolefin resin, a polyethylene terephthalate resin, or a polyester resin, or a thermosetting resin such as an epoxy resin or a silicone resin can be used, for example.

The light source 20A may include a first light adjustment member 23. The first light adjustment member 23 configures an upper surface of the light source 20A. The first light adjustment member 23 covers the upper surface of the light-emitting element 21. The first light adjustment member 23 is disposed on an upper surface of the second light-transmissive member 22, and controls the amount and an emission direction of light emitted from the upper surface of the second light-transmissive member 22. The first light adjustment member 23 is light-reflective and light-transmissive to light emitted from the light-emitting element 21. A part of the light emitted from the upper surface of the second light-transmissive member 22 is reflected by the first light adjustment member 23, and another part thereof is transmitted through the first light adjustment member 23. A transmittance of the first light adjustment member 23 with respect to the light emitted from the light-emitting element 21 is preferably in a range from 1% to 50% and more preferably in a range from 3% to 30%, for example. In this way, luminance directly above the light source 20A is reduced, and luminance unevenness of the planar light source 1 is reduced.

The first light adjustment member 23 can be formed of a light-transmissive resin and a light reflective substance contained in the light-transmissive resin. As the light-transmissive resin, a thermoplastic resin such as an acrylic resin, a polycarbonate resin, a cyclic polyolefin resin, a polyethylene terephthalate resin, or a polyester resin, or a thermosetting resin such as an epoxy resin or a silicone resin can be used, for example. As the light reflective substance, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example. The first light adjustment member 23 may be, for example, a metal member made of aluminum or silver, or a dielectric multilayer film.

In other embodiments, the light source does not include the covering member 24. For example, a light source 20B illustrated in FIG. 7C includes a lower surface configuring the lower surface of the light-emitting element 21 and the lower surface of the second light-transmissive member 22.

Figure 7D:
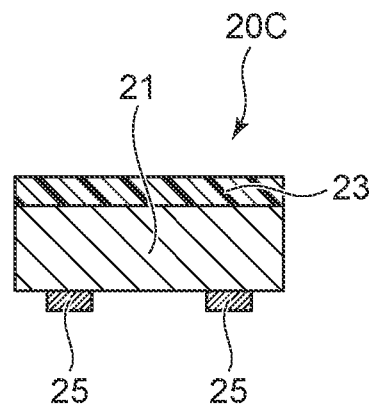
FIG. 7D is a schematic cross-sectional view illustrating a modified example of the light source according to the embodiments.

Further, as illustrated in FIG. 7D, a light source 20C may be the light-emitting element 21 alone. The first light adjustment member 23 is disposed on the upper surface of the light-emitting element 21. In the light source 20C, the covering member 24 is not disposed on the lower surface of the light-emitting element 21, but in other embodiments, the covering member 24 may be disposed on the lower surface of the light-emitting element 21.

First Light-Transmissive Member

The planar light source 1 can further include a first light-transmissive member 30. The first light-transmissive member 30 is light-transmissive to the light emitted from the light source 20A. A transmittance of the first light-transmissive member 30 with respect to a peak wavelength of the light source 20A is preferably equal to or greater than 50% and more preferably equal to or greater than 70%, for example. For example, a resin can be used as a material of the first light-transmissive member 30. For example, as the material of the first light-transmissive member 30, the same resin as the material of the light guide member 10 or a resin having a small difference in refractive index from the material of the light guide member 10 can be used.

The first light-transmissive member 30 may be formed of a single layer or may be formed of a layered body of a plurality of layers in the Z direction. The first light-transmissive member 30 may contain a phosphor or a light reflective substance. When the first light-transmissive member 30 is a layered body, each layer may or may not contain a phosphor and/or light scattering particles. For example, the first light-transmissive member 30 may be formed of a layer containing a phosphor and a layer that does not contain a phosphor.

The first light-transmissive member 30 is disposed between a lateral surface of the light source 20A and the light guide member 10 in the hole 13 of the light guide member 10, and is disposed on the light source 20A. The first light-transmissive member 30 covers the upper surface and the lateral surface of the light source 20A. The first light-transmissive member 30 is preferably in contact with the light guide member 10 and the light source 20A. In this way, the light from the light source 20A is easily guided to the light guide member 10.

The first light-transmissive member 30 includes a first light-transmissive portion 31 located on the first light adjustment member 23 of the light source 20A, and a second light-transmissive portion 32 located between the lateral surface of the light source 20A and the light guide member 10.

Second Light Adjustment Member

The planar light source 1 can further include a second light adjustment member 40. The second light adjustment member 40 is disposed on the first light-transmissive member 30. As illustrated in FIG. 4, the second light adjustment member 40 is disposed in a position overlapping the hole 13 in which the light source 20A and the first light-transmissive member 30 are disposed in the top view.

The second light adjustment member 40 is light-reflective and light-transmissive to the light emitted from the light source 20A. A transmittance of the second light adjustment member 40 with respect to a peak wavelength of the light source 20A is preferably in a range from 1% to 50% and more preferably in a range from 3% to 30%, for example.

The second light adjustment member 40 can be formed of a light-transmissive resin and a light reflective substance contained in the light-transmissive resin. As the light-transmissive resin, a thermoplastic resin such as an acrylic resin, a polycarbonate resin, a cyclic polyolefin resin, a polyethylene terephthalate resin, or a polyester resin, or a thermosetting resin such as an epoxy resin or a silicone resin can be used, for example. As the light reflective substance, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example. The second light adjustment member 40 may be, for example, a metal member made of aluminum or silver, or a dielectric multilayer film.

An upper surface 40a of the second light adjustment member 40 functions as a light-emitting surface (light exit surface) of the planar light source 1 together with the second surface 12 of the light guide member 10. The second light adjustment member 40 reflects a part of the light heading upward above the hole 13 in which the light source 20A is disposed, and transmits another part. In this way, in the light-emitting surface of the planar light source 1, a difference between luminance of a region directly above and around the light source 20A and luminance of another region can be reduced. In this way, luminance unevenness in the light-emitting surface of the planar light source 1 can be reduced.

The first light-transmissive portion 31 of the first light-transmissive member 30 is disposed between the second light adjustment member 40 and the first light adjustment member 23 of the light source 20A. The first light-transmissive member 30 has a higher transmittance with respect to the light emitted from the light source 20A than a transmittance of the first light adjustment member 23 and the second light adjustment member 40. The transmittance of the first light-transmissive member 30 with respect to the light emitted from the light source 20A can be set in a range from twice to 100 times the transmittance of the first light adjustment member 23 and the transmittance of the second light adjustment member 40 in a range of equal to or less than 100%. Light emitted from the lateral surface of the light source 20A, light reflected by a light reflective member 53, and the like are guided into the first light-transmissive portion 31 between the second light adjustment member 40 and the first light adjustment member 23. In this way, a region directly above the light source 20A is not too bright and not too dark. As a result, luminance unevenness in the light-emitting surface of the planar light source 1 can be reduced.

Because the first light adjustment member 23 suppresses transmission of a part of the light emitted in a directly upward direction from the light source 20A, the transmittance of the second light adjustment member 40 is preferably higher than the transmittance of the first light adjustment member 23 with respect to the light emitted from the light source 20A in order to suppress the region directly above the light source 20A from becoming too dark.

Figure 21:
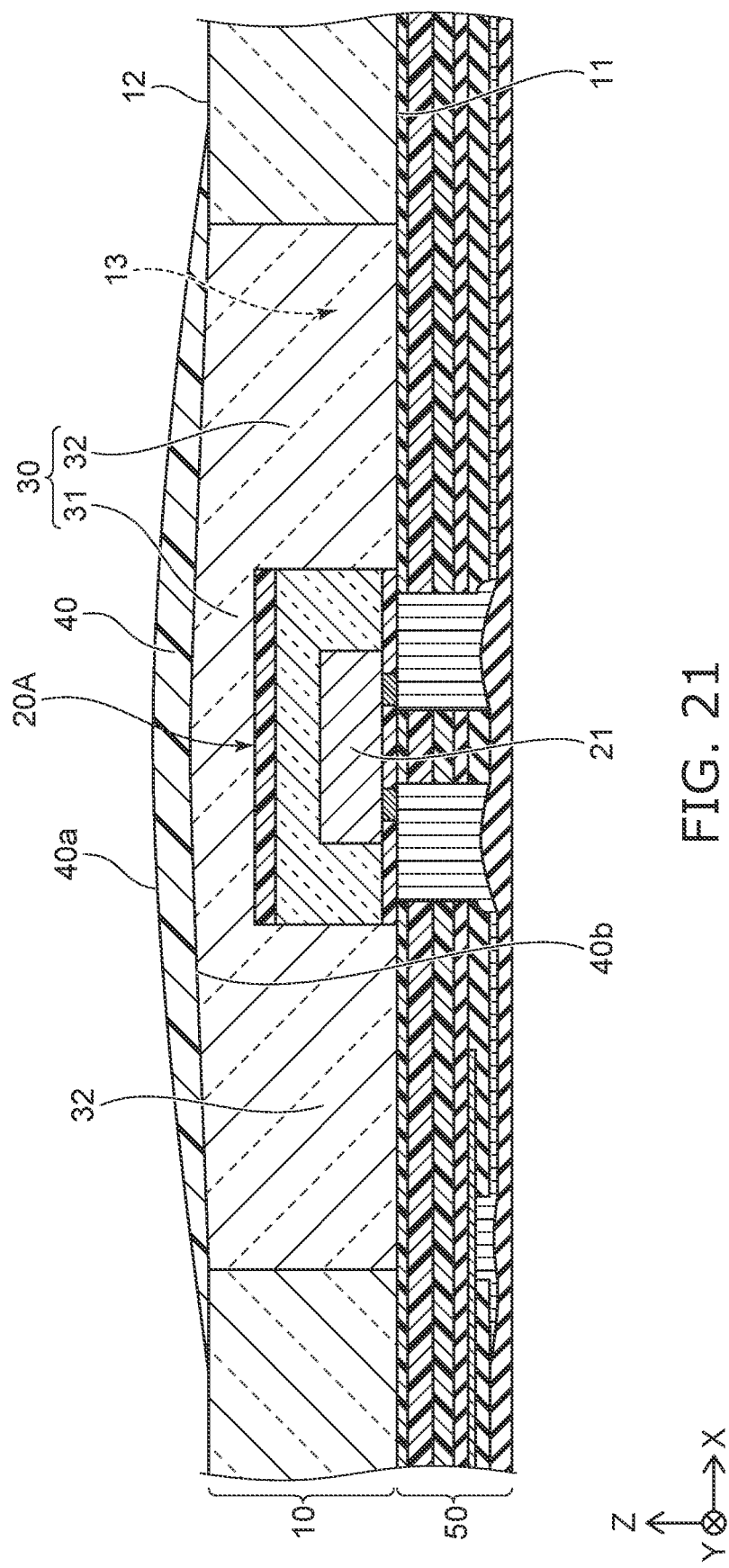
FIG. 21 is a schematic cross-sectional view illustrating a modified example of a second light adjustment member.

As illustrated in FIG. 21, a lower surface 40b of the second light adjustment member 40 is a concave surface or a flat surface, and the upper surface 40a may be a convex surface.

Figure 22:
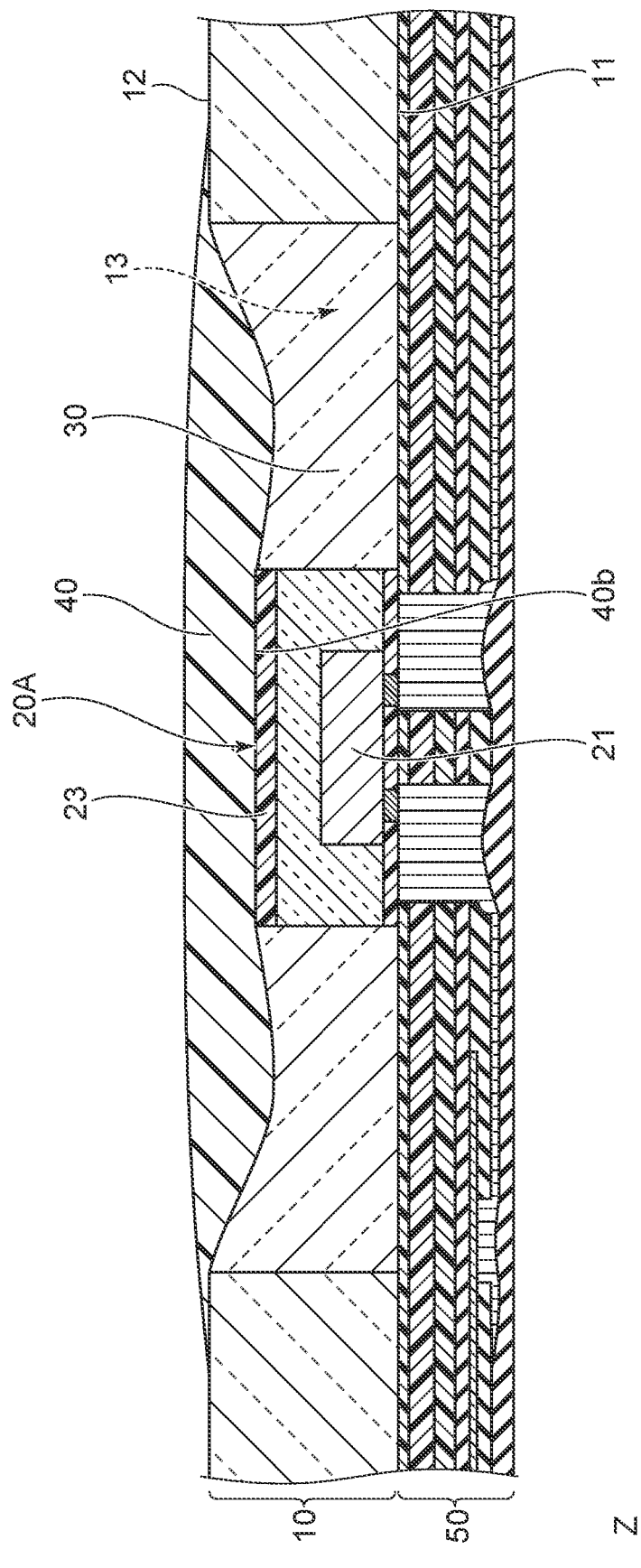
FIG. 22 is a schematic cross-sectional view illustrating a modified example of the second light adjustment member.

As illustrated in FIG. 22, the lower surface 40b of the second light adjustment member 40 may be in contact with an upper surface of the first light adjustment member 23 of the light source 20A.

Support Member

The support member 110 includes a module support portion 50 that supports a light-emitting module including the light guide member 10 and the light source 20A. The light guide member 10 is disposed on the module support portion 50 with the first surface 11 facing an upper surface of the module support portion 50. The light source 20A is disposed on the module support portion 50 in the hole 13 of the light guide member 10.

As illustrated in FIG. 6, the module support portion 50 includes a wiring substrate 60. The wiring substrate 60 includes an insulating base member 61, and at least one layer of a first conductive portion 62 disposed on at least one surface of the insulating base member 61. The insulating base member 61 may be a rigid substrate, or may be a flexible substrate. The insulating base member 61 is preferably a flexible substrate for reducing a thickness of the planar light source 1. The insulating base member 61 may be formed of a single layer or may be formed of a layered body of a plurality of layers in the Z direction. For example, the insulating base member 61 may be formed of a single-layer flexible substrate, or may be formed of a layered body of a plurality of rigid substrates. For example, a resin such as a polyimide can be used as a material of the insulating base member 61. The first conductive portion 62 is a metal film, for example, a copper film.

The module support portion 50 further includes a third adhesive member 51 disposed on the wiring substrate 60, the light reflective member 53 disposed on the third adhesive member 51, and a fourth adhesive member 52 disposed on the light reflective member 53.

The third adhesive member 51 is disposed on a surface of the insulating base member 61 on an opposite side to the surface on which the first conductive portion 62 is disposed. The third adhesive member 51 is disposed between the insulating base member 61 and the light reflective member 53, and adheres the insulating base member 61 and the light reflective member 53. The third adhesive member 51 is, for example, a resin layer containing a light reflective substance. As the light reflective substance, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example. As the resin of the third adhesive member 51, a silicone resin, a urethane resin, an epoxy resin, an acrylic resin, or a cyclic polyolefin resin can be used, for example.

The light reflective member 53 is disposed below the first surface 11 of the light guide member 10, below the light source 20A, below the first light-transmissive member 30, and below the groove 14. The light reflective member 53 has light reflectivity to the light emitted from the light source 20A. As the light reflective member 53, a resin member with many foams or a resin member containing a light reflective substance can be used, for example. As the resin of the light reflective member 53, a polyethylene terephthalate (PET) resin, a cyclic polyolefin resin, an acrylic resin, a silicone resin, a urethane resin, or an epoxy resin can be used, for example. As the light reflective substance, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example.

In a region between the light reflective member 53 and the second surface 12 of the light guide member 10, the light from the light source 20A is repeatedly reflected by the light reflective member 53 and the second surface 12, and is also guided toward the groove 14 in the light guide member 10. A part of the light toward the second surface 12 is extracted from the second surface 12 to the outside of the light guide member 10. A part of the light toward the first surface 11 is reflected to the second surface 12 side by the light reflective member 53, and thus luminance of the light extracted from the second surface 12 can be improved. Imparting light reflectivity to the third adhesive member 51 disposed on the lower surface of the light reflective member 53 can further improve luminance of the light extracted from the second surface 12.

The fourth adhesive member 52 is disposed between the light reflective member 53 and the first surface 11 of the light guide member 10, and adheres the light reflective member 53 and the light guide member 10. Further, the light source 20A is disposed on the fourth adhesive member 52 in the hole 13 of the light guide member 10. The fourth adhesive member 52 is light-transmissive to the light emitted from the light source 20A. As a material of the fourth adhesive member 52, an epoxy resin, an acrylic resin, a cyclic polyolefin resin, or the like can be used, for example.

The module support portion 50 further includes a first insulating member 54. The first insulating member 54 is disposed on the surface of the insulating base member 61 of the wiring substrate 60 on which the first conductive portion 62 is disposed, and covers the first conductive portion 62. As a material of the first insulating member 54, an epoxy resin, a urethane resin, or an acrylic resin can be used, for example.

The module support portion 50 further includes a second conductive portion 70. The second conductive portion 70 includes, for example, a resin and metal particles contained in the resin. As the resin of the second conductive portion 70, an epoxy resin or a phenol resin can be used, for example. For example, particles of copper or silver can be used as the metal particles.

The second conductive portion 70 includes a connection portion 71 and a wiring portion 72. The connection portion 71 penetrates the fourth adhesive member 52, the light reflective member 53, the third adhesive member 51, the insulating base member 61, and the first insulating member 54 in the Z direction. The wiring portion 72 is disposed on a surface of the first insulating member 54 on an opposite side to a surface facing the wiring substrate 60, and is connected to the connection portion 71. The connection portion 71 and the wiring portion 72 can be integrally formed of the same material, for example. A portion 72a of the wiring portion 72 penetrates the first insulating member 54, and is connected to the first conductive portion 62.

A pair of the second conductive portions 70 are disposed away from each other corresponding to the pair of positive and negative electrodes 25 of the light source 20A. The connection portion 71 of one of the second conductive portions 70 is connected to the positive electrode 25 on the lower part of the light source 20A, and the connection portion 71 of the other one of the second conductive portions 70 is connected to the negative electrode 25 on the lower part of the light source 20A. The electrode 25 of the light source 20A is electrically connected to the second conductive portion 70 and the first conductive portion 62.

The module support portion 50 further includes a second insulating member 55. The second insulating member 55 is disposed on the surface of the first insulating member 54 on which the second conductive portion 70 is disposed, and covers the second conductive portion 70 for protection.

Figure 2:
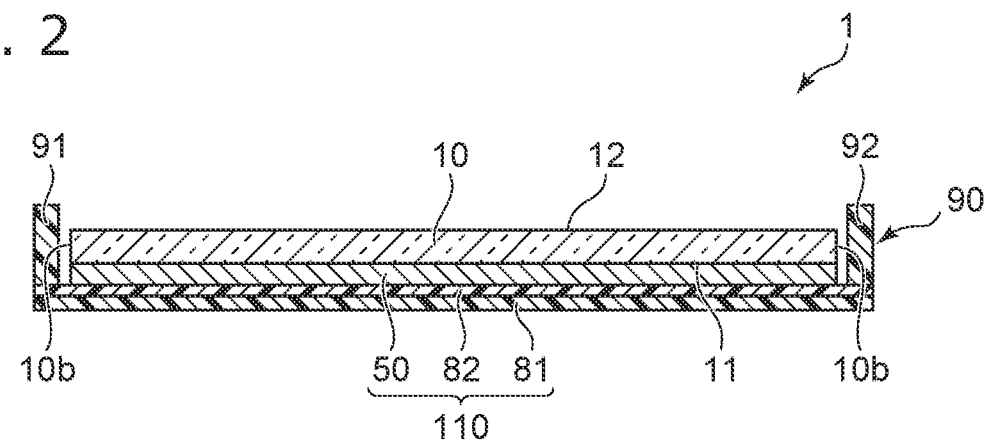
FIG. 2 is a schematic cross-sectional view taken along a line II-II in FIG. 1.

As illustrated in FIG. 2, the support member 110 includes a base member 81 that supports the module support portion 50 including the wiring substrate 60 and the like described above. The module support portion 50 is located between the base member 81 and the light guide member 10. The support member 110 further includes a first adhesive member 82. The first adhesive member 82 is disposed between the module support portion 50 and the base member 81. The module support portion 50 is fixed onto the base member 81 via the first adhesive member 82.

For example, a resin such as a PET resin can be used as a material of the base member 81. The first adhesive member 82 is a resin layer. The first adhesive member 82 can contain a light reflective substance. In this way, luminance of the light extracted from the light-emitting surface of the planar light source 1 can be further improved. As the light reflective substance, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example. As the resin of the first adhesive member 82, an epoxy resin, an acrylic resin, or a cyclic polyolefin resin can be used, for example.

First Reinforcing Member

As illustrated in FIG. 1, the first reinforcing member 90 surrounds the light guide member 10 in a plan view. The first reinforcing member 90 includes a first portion 91, a second portion 92, a third portion 93, and a fourth portion 94. The first portion 91 and the second portion 92 extend in a first direction d1. The first direction d1 is a direction parallel to the X direction or the Y direction described above with reference to FIG. 4. The first portion 91 and the second portion 92 are located away from each other in a second direction d2 orthogonal to the first direction d1, and face each other. The third portion 93 and the fourth portion 94 extend in the second direction d2. The third portion 93 and the fourth portion 94 are located away from each other in the first direction d1, and face each other. In the plan view, the light guide member 10 is located between the first portion 91 and the second portion 92 in the second direction d2, and is located between the third portion 93 and the fourth portion 94 in the first direction d1.

In the example illustrated in FIG. 1, the first portion 91, the second portion 92, and the third portion 93 are integrally formed. The fourth portion 94 overlaps the first portion 91 and the second portion 92 in the second direction d2, for example. Alternatively, the fourth portion 94 may overlap the first portion 91 and the second portion 92 in the first direction d1.

Further, the first reinforcing member 90 may be formed by combining the integrally formed first portion 91 and third portion 93 with the integrally formed second portion 92 and fourth portion 94. Further, the first reinforcing member 90 may be formed by combining the integrally formed first portion 91 and fourth portion 94 with the integrally formed second portion 92 and third portion 93. Further, all of the first portion 91, the second portion 92, the third portion 93, and the fourth portion 94 may be integrally formed.

Figure 20A:
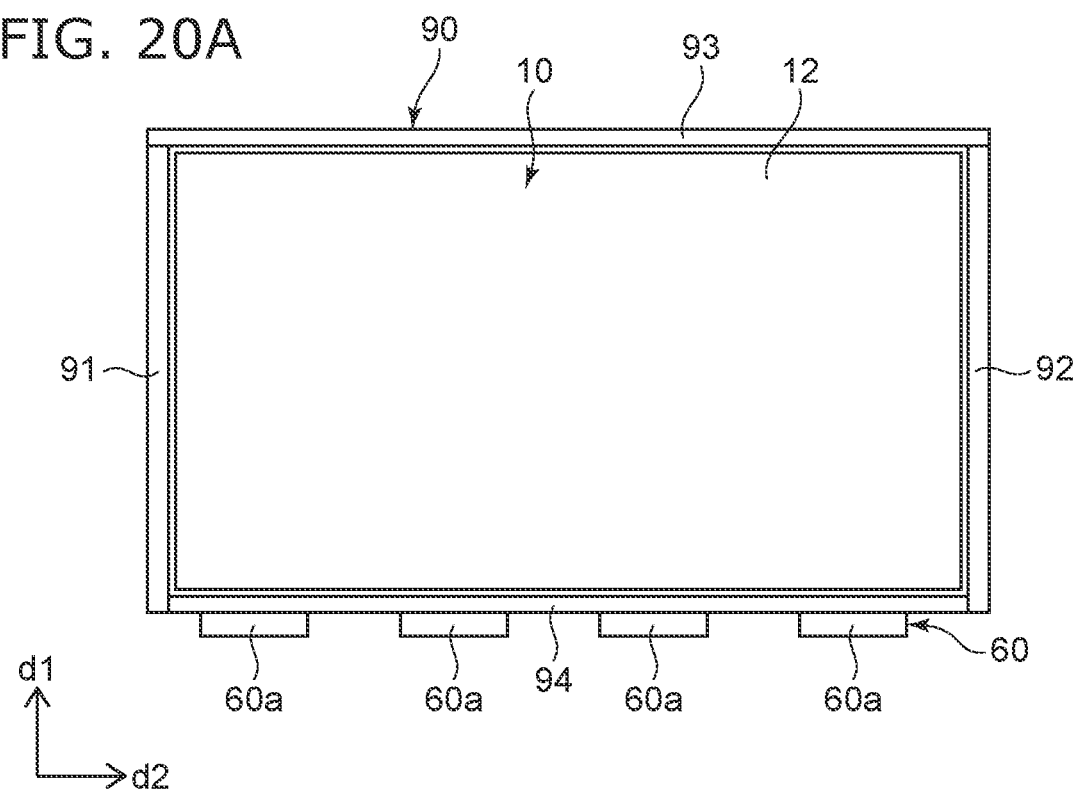
FIG. 20A is a schematic top view illustrating a modified example of the first reinforcing member.
Figure 20B:
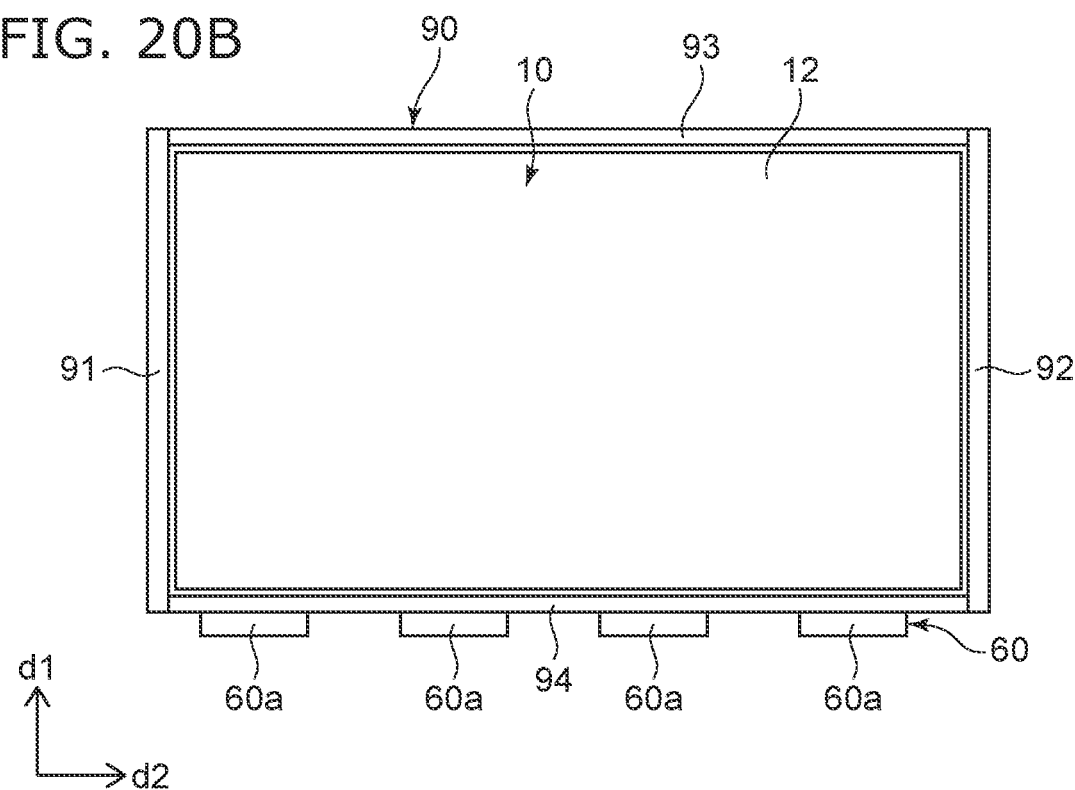
FIG. 20B is a schematic top view illustrating a modified example of the first reinforcing member.

Each of the first portion 91, the second portion 92, the third portion 93, and the fourth portion 94 may be an individual component. For example, as illustrated in FIG. 20A, in the first direction d1, the first portion 91 and the third portion 93 overlap each other, and the second portion 92 and the third portion 93 overlap each other. Alternatively, as illustrated in FIG. 20B, in the second direction d2, the first portion 91 and the third portion 93 overlap each other, and the second portion 92 and the third portion 93 overlap each other.

The first reinforcing member 90 is disposed on the support member 110. As illustrated in FIG. 2, the first portion 91 and the second portion 92 are disposed on the base member 81. The first portion 91 and the second portion 92 are fixed onto the base member 81 via the first adhesive member 82. An inner lateral surface of the first portion 91 and an inner lateral surface of the second portion 92 face an outer lateral surface(s) 10b of the light guide member 10 across a gap.

Similarly to the first portion 91 and the second portion 92, the third portion 93 is also fixed onto the base member 81 via the first adhesive member 82. An inner lateral surface of the third portion 93 faces the outer lateral surface 10b of the light guide member 10 across a gap.

As illustrated in FIG. 1, the wiring substrate 60 includes an external connection portion 60a. The external connection portion 60a includes a terminal portion electrically connected to the first conductive portion 62. The external connection portion 60a extends in a direction from the third portion 93 to the fourth portion 94 in the first direction d1, and is located closer to the outside than the fourth portion 94 relative to the center of the wiring substrate 60 in the first direction d1 and the second direction d2. A connector of an external circuit is connected to the external connection portion 60a, and power is supplied from the external circuit to the light source 20A through the external connection portion 60a, the first conductive portion 62, and the second conductive portion 70.

Figure 3:
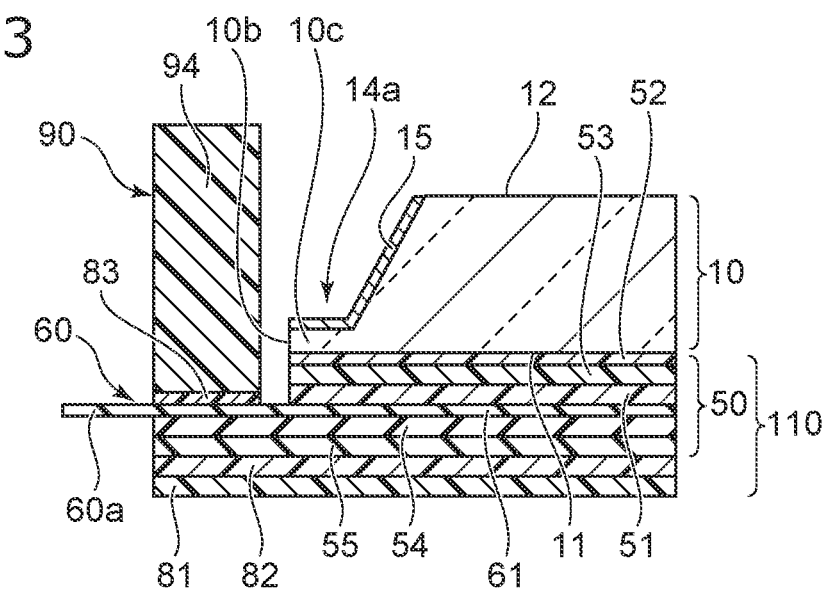
FIG. 3 is a schematic cross-sectional view taken along a line III-III in FIG. 1.

As illustrated in FIG. 3, the fourth portion 94 is fixed onto the insulating base member 61 of the wiring substrate 60 via the second adhesive member 83, for example. As a material of the second adhesive member 83, an epoxy resin, an acrylic resin, a cyclic polyolefin resin, or the like can be used, for example. An inner lateral surface of the fourth portion 94 faces the outer lateral surface 10b of the light guide member 10 across a gap. For example, the outer lateral surface 10b of the light guide member 10 is a lateral surface of a portion 10c of the light guide member 10 located below the first groove portion 14a.

In the example illustrated in FIG. 3, a lower surface of the fourth portion 94 is a flat surface. The fourth portion 94 may have a recessed portion (or a hole) on the lower surface side. A portion of the wiring substrate 60 on the external connection portion 60a side may be configured to extend closer to the outside than the fourth portion 94 through the recessed portion (or the hole).

The rigidity of the first reinforcing member 90 is preferably greater than the rigidity of the wiring substrate 60. Further, the rigidity of the first reinforcing member 90 is preferably greater than the rigidity of the light guide member 10. The rigidity represents a degree of difficulty of deformation against bending and twisting force, and is determined by a material, a thickness, and a shape. Greater rigidity results in smaller deformation against a fixed load. According to the present embodiment, even when a reduction in thickness of the wiring substrate 60 and the light guide member 10 advances, the first reinforcing member 90 can suppress deformation of the planar light source 1. The first reinforcing member 90 includes, for example, a resin. Further, a thickness of the first portion 91 in the second direction d2, a thickness of the second portion 92 in the second direction d2, a thickness of the third portion 93 in the first direction d1, and a thickness of the fourth portion 94 in the first direction d1 are preferably thicker than a thickness of the wiring substrate 60. In this way, the rigidity of the first portion 91, the second portion 92, the third portion 93, and the fourth portion 94 is easily increased.

A region of the light guide member 10 on the outer lateral surface 10b side in which the first reinforcing member 90 is disposed tends to decrease in luminance as compared with a peripheral region of the light source 20A. According to the present embodiment, at least one of the first portion 91, the second portion 92, the third portion 93, and the fourth portion 94 of the first reinforcing member 90 has light reflectivity to the light emitted from the light source 20A. In this way, light emitted from the outer lateral surface 10b and the inside surface of the first groove portion 14a to the side of the light guide member 10 can be reflected upward by the first reinforcing member 90, and a luminance decrease in the region of the light guide member 10 on the outer lateral surface 10b side can be suppressed. As a result, luminance unevenness in the planar light source 1 on the light-emitting surface side can be reduced. When all of the first portion 91, the second portion 92, the third portion 93, and the fourth portion 94 are configured to have light reflectivity, a luminance decrease in the region on the outer lateral surface 10b side on all four sides surrounding the light guide member 10 in a plan view can be suppressed.

The light reflective portion of the first reinforcing member 90 is, for example, a resin member containing a light reflective substance. As the light reflective substance, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example. As the resin, an epoxy resin, an acrylic resin, or a cyclic polyolefin resin can be used, for example.

As illustrated in FIG. 2, a maximum height of the first portion 91 and a maximum height of the second portion 92 are preferably higher than a maximum height of the light guide member 10. The maximum height represents a maximum height of an upper surface of each member with reference to a lowermost surface of the planar light source 1. A maximum height of the third portion 93 is also preferably higher than the maximum height of the light guide member 10. Further, as illustrated in FIG. 3, a maximum height of the fourth portion 94 is preferably higher than the maximum height of the light guide member 10. In this way, the light emitted from the outer lateral surface 10b of the light guide member 10 and the inside surface of the first groove portion 14a can be easily reflected upward by the first reinforcing member 90.

At least a part of the first reinforcing member 90 preferably has the same height as that of at least a part of the light guide member 10. For example, the first reinforcing member 90 may be disposed on the portion 10c located below the first groove portion 14a in the light guide member 10 illustrated in FIG. 3. Also in this case, because an inner lateral surface of the first reinforcing member 90 faces the inside surface of the first groove portion 14a, the light emitted from the inside surface of the first groove portion 14a can be reflected upward by the first reinforcing member 90 having light reflectivity. In a configuration in which all portions in the thickness direction of the light guide member 10 are surrounded by the first reinforcing member 90, all of the light emitted toward the lateral side of the light guide member 10 can be reflected upward by the first reinforcing member 90. Further, the first reinforcing member 90 may be fixed to the support member 110 by a double-sided tape, a screw, or the like.

Figure 18A:
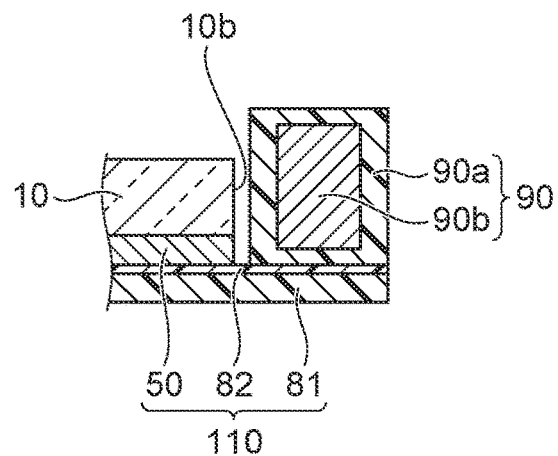
FIG. 18A is a schematic cross-sectional view illustrating a modified example of a first reinforcing member.

The first reinforcing member 90 can include a metal. For example, as illustrated in FIG. 18A, the first reinforcing member 90 includes a resin portion 90a, and a metal portion 90b embedded in the resin portion 90a. The metal portion 90b can be embedded in the resin portion 90a by, for example, insert molding. The rigidity of the first reinforcing member 90 including a metal is more easily increased as compared with the first reinforcing member 90 formed of a resin without including a metal. In the first reinforcing member 90, the resin portion may be configured to cover a part of a surface of the metal portion. In this way, the resin portion can serve as a buffer material, and thus a scratch generated on a member in contact with the first reinforcing member 90 can be suppressed. Further, the first reinforcing member 90 may be formed of a metal without including a resin.

Figure 18B:
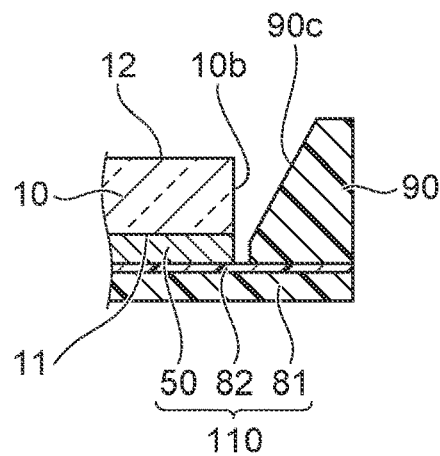
FIG. 18B is a schematic cross-sectional view illustrating a modified example of the first reinforcing member.

As illustrated in FIG. 18B, the inner lateral surface of the first reinforcing member 90 facing the outer lateral surface 10b of the light guide member 10 may have an inclined surface 90c expanding upward from the first surface 11 to the second surface 12 of the light guide member 10. The inclined surface 90c can cause the light emitted from the outer lateral surface 10b of the light guide member 10 to be easily reflected upward.

Figure 19A:
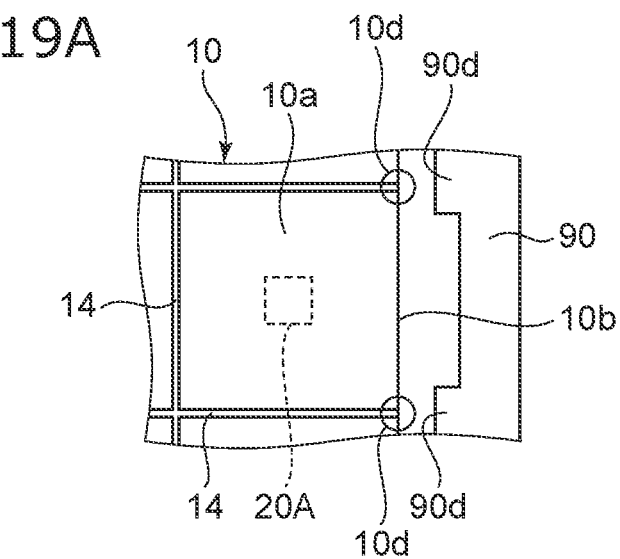
FIG. 19A is a schematic top view illustrating a modified example of the first reinforcing member.

FIG. 19A illustrates a schematic plan view of one light guide portion 10a adjacent to the outer lateral surface 10b of the light guide member 10 among the plurality of light guide portions 10a partitioned by the groove 14, and the first reinforcing member 90 facing the outer lateral surface 10b of the light guide portion 10a.

A shape of the light guide portion 10a in the plan view is a quadrilateral, and the light source 20A is disposed on the central portion of the light guide portion 10a. A distance in which the light from the light source 20A is guided toward a corner portion 10d of the light guide portion 10a on the outer lateral surface 10b side is greater than a distance in which the light from the light source 20A is guided toward the outer lateral surface 10b other than the corner portion 10d. Thus, in the light guide portion 10a, the corner portion 10d tends to be darker than the outer lateral surface 10b other than the corner portion 10d.

Thus, in the example illustrated in FIG. 19A, in the first reinforcing member 90 having light reflectivity, a width of a portion 90d facing the corner 10d of the light guide portion 10a (a width in a direction orthogonal to a direction in which the first reinforcing member 90 is elongated in a top view) is greater than a width of the other portion (a width in a direction orthogonal to a direction in which the first reinforcing member 90 is elongated in a top view). A distance between the portion 90d and the light source 20A can be shortened by the increase in the width of the portion 90d. In this way, the amount of reflected light in the portion 90d can be increased, and a decrease in luminance of the corner portion 10d of the light guide portion 10a facing the portion 90d can be suppressed.

Figure 19B:
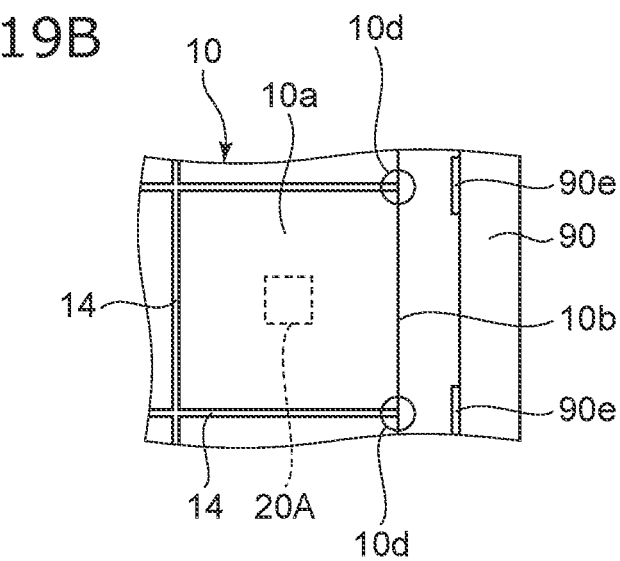
FIG. 19B is a schematic top view illustrating a modified example of the first reinforcing member.

Further, as illustrated in FIG. 19B, a reflection portion 90e having a higher reflectance with respect to the light emitted from the light source 20A than a reflectance of a material of the first reinforcing member 90 may be disposed on a portion of the first reinforcing member 90 facing the corner portion 10d of the light guide portion 10a. As the reflection portion 90e, for example, a resin material including a light reflective substance can be disposed by application.

Second Embodiment

Figure 8:
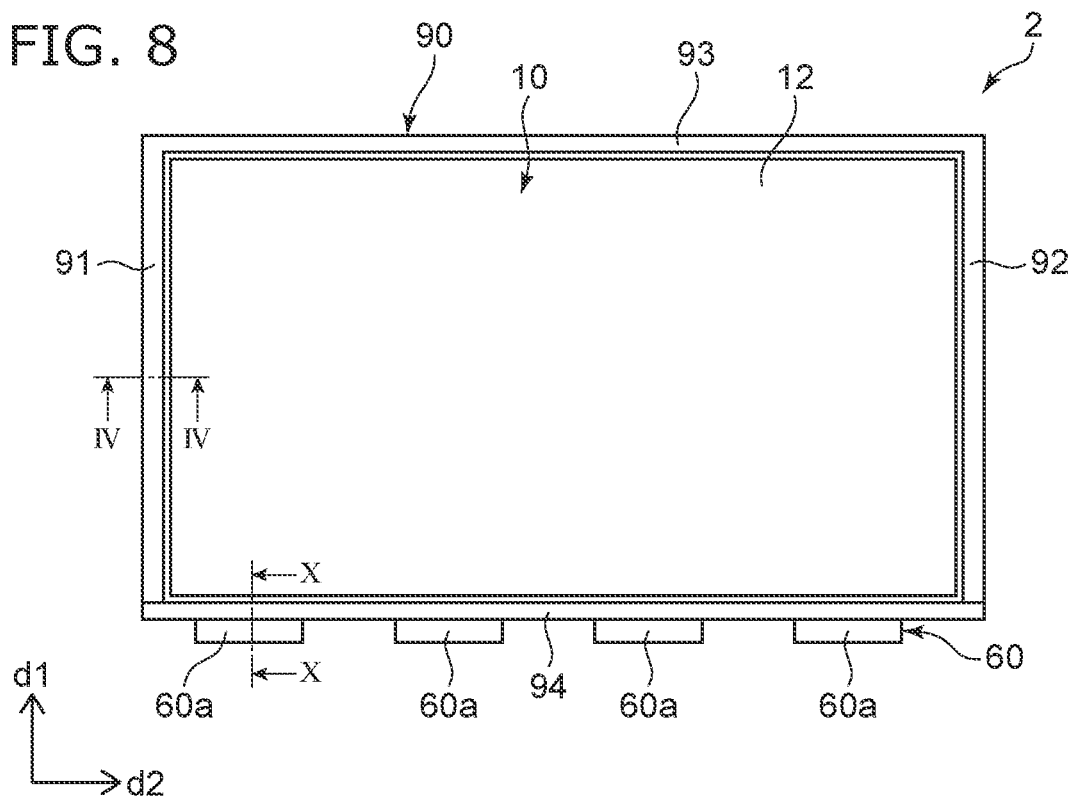
FIG. 8 is a schematic top view of a planar light source according to a second embodiment.
Figure 9:
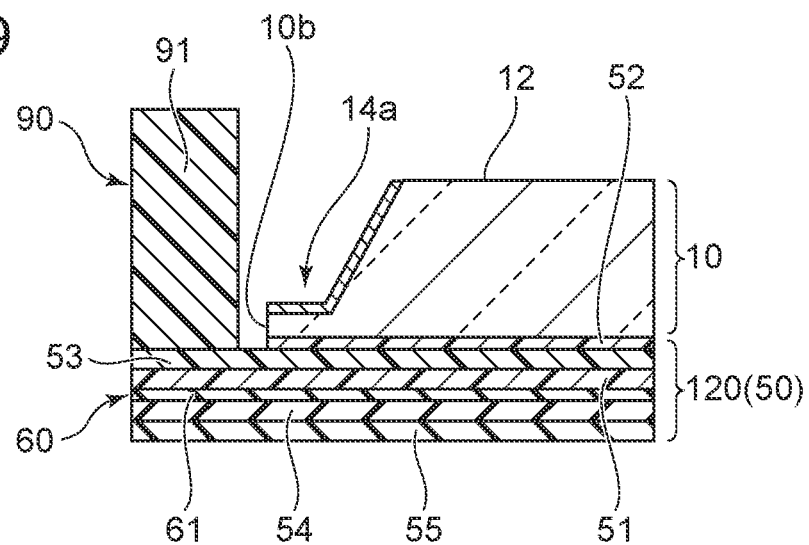
FIG. 9 is a schematic cross-sectional view taken along a line IV-IV in FIG. 8.
Figure 10:
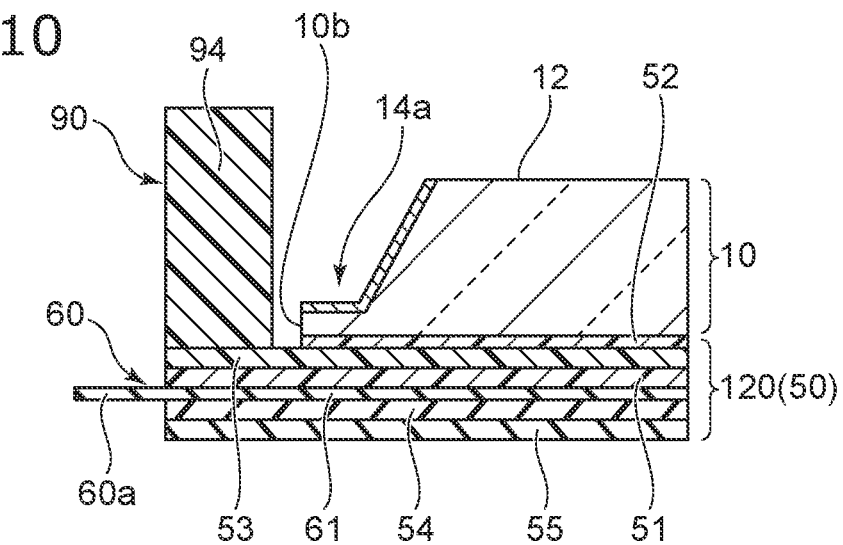
FIG. 10 is a schematic cross-sectional view taken along a line X-X in FIG. 8.

FIG. 8 is a schematic top view of a planar light source 2 according to a second embodiment. FIG. 9 is a schematic cross-sectional view taken along a line IV-IV in FIG. 8. FIG. 10 is a schematic cross-sectional view taken along a line X-X in FIG. 8.

As illustrated in FIGS. 9 and 10, the planar light source 2 according to the second embodiment includes a support member 120. The support member 120 includes a module support portion 50, and does not include the base member 81 and the first adhesive member 82 that are included in the support member 110 according to the first embodiment.

As illustrated in FIG. 9, a first portion 91 of a first reinforcing member 90 is disposed on a light reflective member 53, and an inner lateral surface of the first portion 91 faces an outer lateral surface 10b of a light guide member 10 and a first groove portion 14a. A lower surface of the first portion 91 is adhesively fixed onto the light reflective member 53, for example. A second portion 92 and a third portion 93 are also disposed on the light reflective member 53, and a lower surface of the second portion 92 and a lower surface of the third portion 93 are adhesively fixed onto the light reflective member 53, for example. As illustrated in FIG. 10, a fourth portion 94 is also disposed on the light reflective member 53, and a lower surface of the fourth portion 94 is adhesively fixed onto the light reflective member 53, for example.

According to the second embodiment, because the base member 81 and the first adhesive member 82 are not provided, and the first reinforcing member 90 is disposed on the light reflective member 53 of the module support portion 50, deformation of the planar light source 2 can be suppressed while reducing a thickness of the planar light source 2.

Third Embodiment

Figure 11:
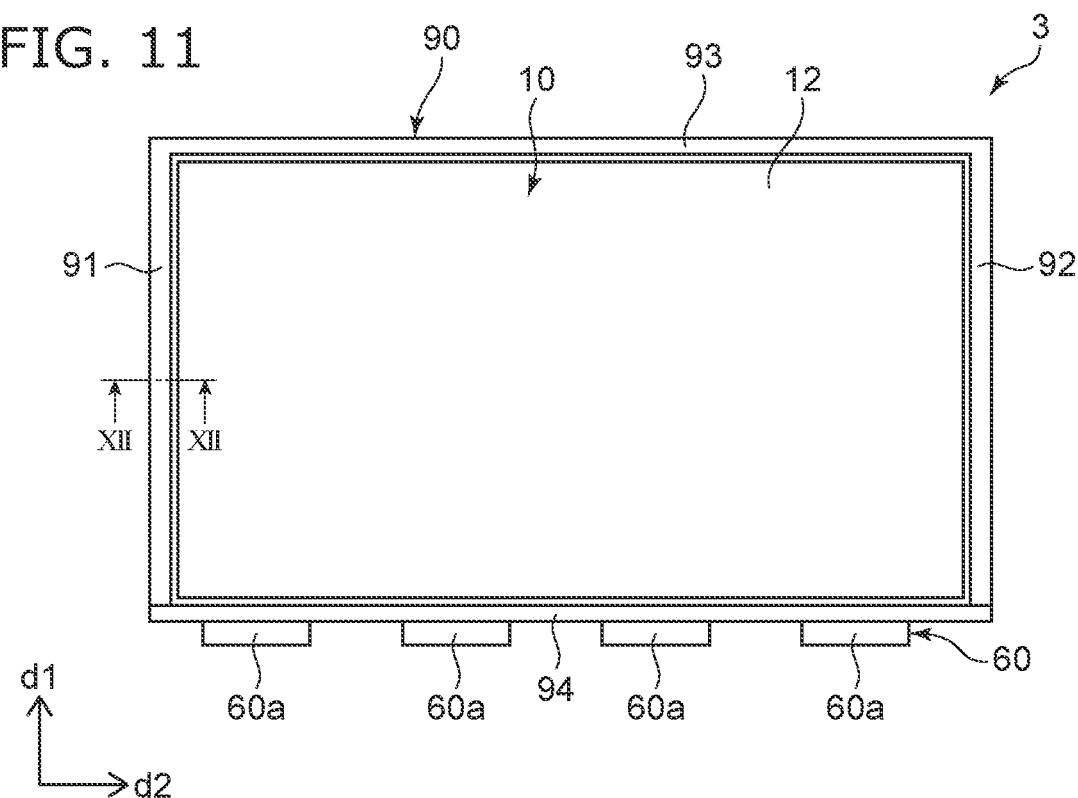
FIG. 11 is a schematic top view of a planar light source according to a third embodiment.
Figure 12:
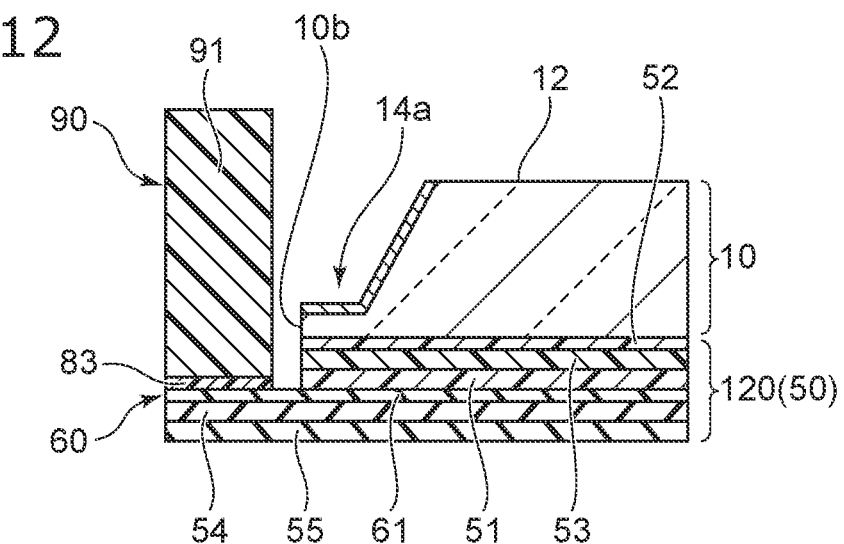
FIG. 12 is a schematic cross-sectional view taken along a line XII-XII in FIG. 11.

FIG. 11 is a schematic top view of a planar light source 3 according to a third embodiment. FIG. 12 is a schematic cross-sectional view taken along a line XII-XII in FIG. 11.

As illustrated in FIG. 12, a support member 120 of the planar light source 3 according to the third embodiment also includes a module support portion 50, and does not include the base member 81 and the first adhesive member 82 that are included in the support member 110 according to the first embodiment.

A first portion 91 of a first reinforcing member 90 is disposed on a wiring substrate 60, and an inner lateral surface of the first portion 91 faces an outer lateral surface 10b of a light guide member 10 and a first groove portion 14a. A lower surface of the first portion 91 is fixed to an insulating base member 61 of the wiring substrate 60 via a second adhesive member 83. A second portion 92, a third portion 93, and a fourth portion 94 are also disposed on the wiring substrate 60. A lower surface of the second portion 92, a lower surface of the third portion 93, and a lower surface of the fourth portion 94 are fixed to the insulating base member 61 of the wiring substrate 60 via the second adhesive member 83.

According to the third embodiment, because the base member 81 and the first adhesive member 82 are not provided, and the first reinforcing member 90 is disposed on the wiring substrate 60 of the module support portion 50, deformation of the planar light source 3 can be suppressed while reducing a thickness of the planar light source 3.

Fourth Embodiment

Figure 13:
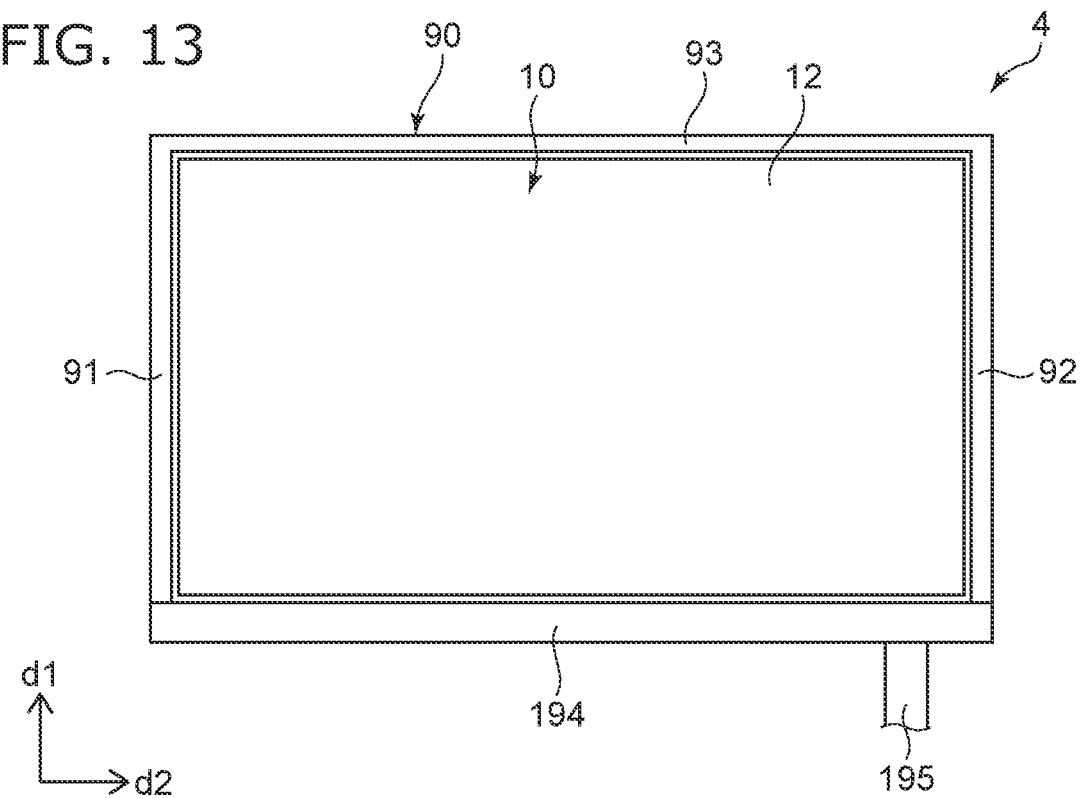
FIG. 13 is a schematic top view of a planar light source according to a fourth embodiment.

FIG. 13 is a schematic top view of a planar light source 4 according to a fourth embodiment.

A fourth portion 194 of a first reinforcing member 90 is a circuit board including a drive circuit that drives a light source 20A. A thickness of the fourth portion 194 in the first direction d1 is preferably greater than a thickness of a wiring substrate 60, and the fourth portion 194 preferably has greater rigidity than that of the wiring substrate 60. A connection member 195 is connected to the drive circuit formed on the fourth portion 194, and the drive circuit is electrically connected to an external circuit through the connection member 195. The connection member 195 includes, for example, an anisotropic conductive film.

Fifth Embodiment

Figure 14:
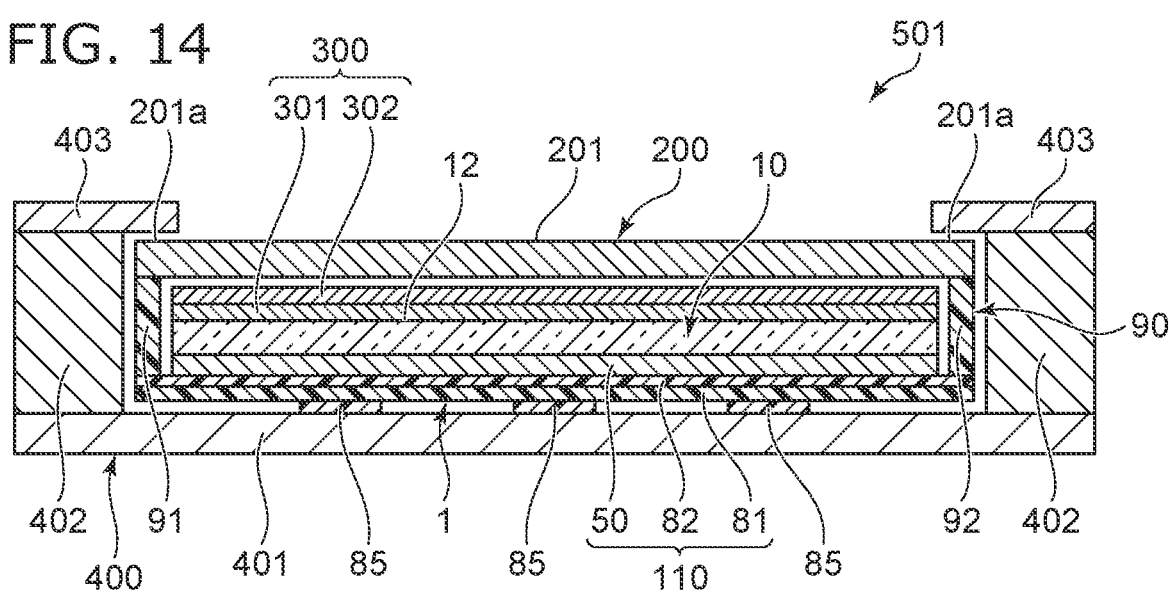
FIG. 14 is a schematic cross-sectional view of a display device according to a fifth embodiment.

FIG. 14 is a schematic cross-sectional view of a display device 501 according to a fifth embodiment.

The display device 501 includes the planar light source 1, a liquid crystal panel 200, and a housing 400. Note that the display device 501 may include any of the planar light sources 2 to 4 according to the other embodiments described above instead of the planar light source 1.

The liquid crystal panel 200 is supported on the first reinforcing member 90, and faces an upper surface (light-emitting surface) of the planar light source 1. The liquid crystal panel 200 is adhesively fixed to an upper surface of the first reinforcing member 90, for example. A contact portion of the first reinforcing member 90 with the liquid crystal panel 200 is formed of a resin, and thus a scratch can be less likely to be generated on the liquid crystal panel 200.

A space is secured between the upper surface of the planar light source 1 and a lower surface of the liquid crystal panel 200. An optical sheet 300 can be disposed in the space. The optical sheet 300 includes, for example, a diffusion sheet 301 disposed on the upper surface of the planar light source 1, and a prism sheet 302 disposed on the diffusion sheet 301.

The housing 400 includes a housing bottom plate 401, a housing lateral plate 402, and a housing top plate 403. The planar light source 1 is supported on the housing bottom plate 401. For example, a lower surface of the support member 110 is fixed onto the housing bottom plate 401 via an adhesive member 85. The housing lateral plate 402 is disposed on the housing bottom plate 401, and surrounds a lateral surface of the planar light source 1 and a lateral surface of the liquid crystal panel 200.

The housing top plate 403 is disposed on the housing lateral plate 402. A part of the housing top plate 403 overlaps an outer peripheral portion 201a of an upper surface 201 of the liquid crystal panel 200 in a plan view. In the plan view, at least a part of the upper surface 201 of the liquid crystal panel 200 is exposed from the housing top plate 403. An image or video displayed on the portion of the upper surface 201 of the liquid crystal panel 200 exposed from the housing top plate 403 can be visually recognized.

Figure 15:
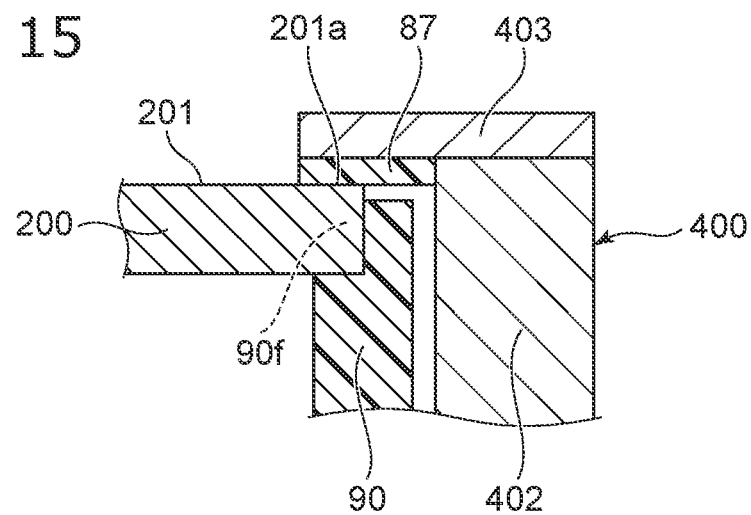
FIG. 15 is a schematic cross-sectional view illustrating a modified example of the display device according to the fifth embodiment.

As illustrated in FIG. 15, a recessed portion 90f is formed on an upper portion of the first reinforcing member 90, and a corner portion between a lower surface and the lateral surface of the liquid crystal panel 200 is disposed on the recessed portion 90f, and thus positioning of the liquid crystal panel 200 with respect to the planar light source can be easily performed. Further, a cushion member 87 may be disposed between the outer peripheral portion 201a of the upper surface 201 of the liquid crystal panel 200 and the housing top plate 403, and the housing top plate 403 may press the outer peripheral portion 201a of the upper surface 201 of the liquid crystal panel 200 via the cushion member 87.

Sixth Embodiment

Figure 16:
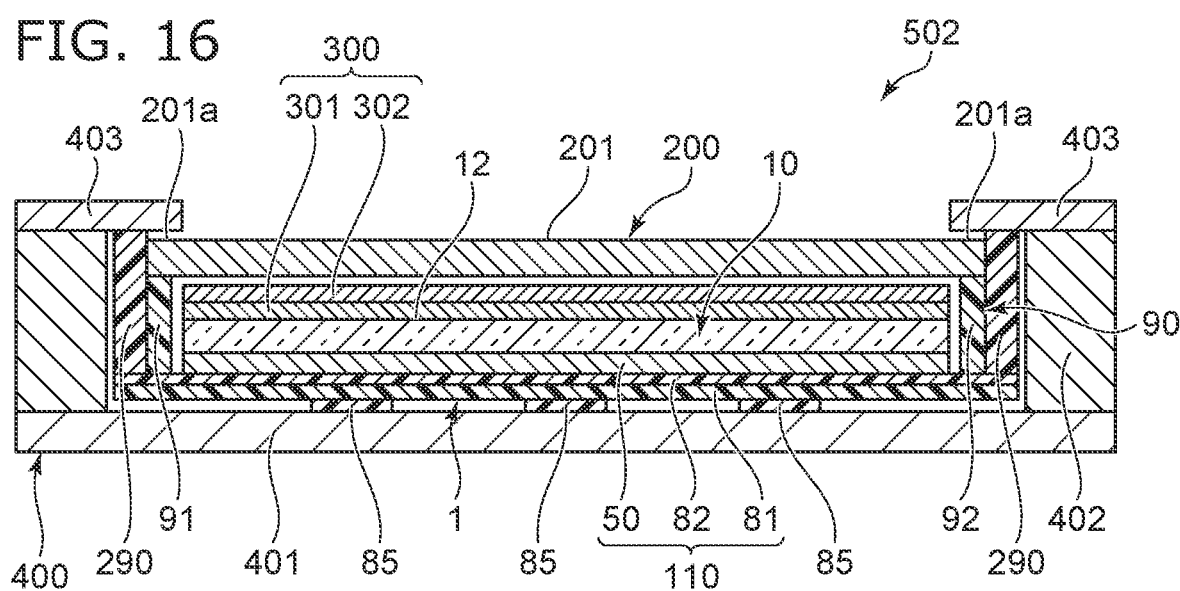
FIG. 16 is a schematic cross-sectional view of a display device according to a sixth embodiment.

FIG. 16 is a schematic cross-sectional view of a display device 502 according to a sixth embodiment.

The display device 502 further includes a second reinforcing member 290. The second reinforcing member 290 is located closer to the outside than a first reinforcing member 90 relative to the center of a wiring substrate 60, and faces a lateral surface of a liquid crystal panel 200. The second reinforcing member 290 is disposed on, for example, the support member 110 of the planar light source 1. A height of an upper surface of the second reinforcing member 290 is higher than a height of an upper surface 201 of the liquid crystal panel 200.

A housing top plate 403 is disposed on a housing lateral plate 402 and the second reinforcing member 290. A part of the housing top plate 403 overlaps an outer peripheral portion 201a of the upper surface 201 of the liquid crystal panel 200 in a plan view.

Seventh Embodiment

Figure 17:
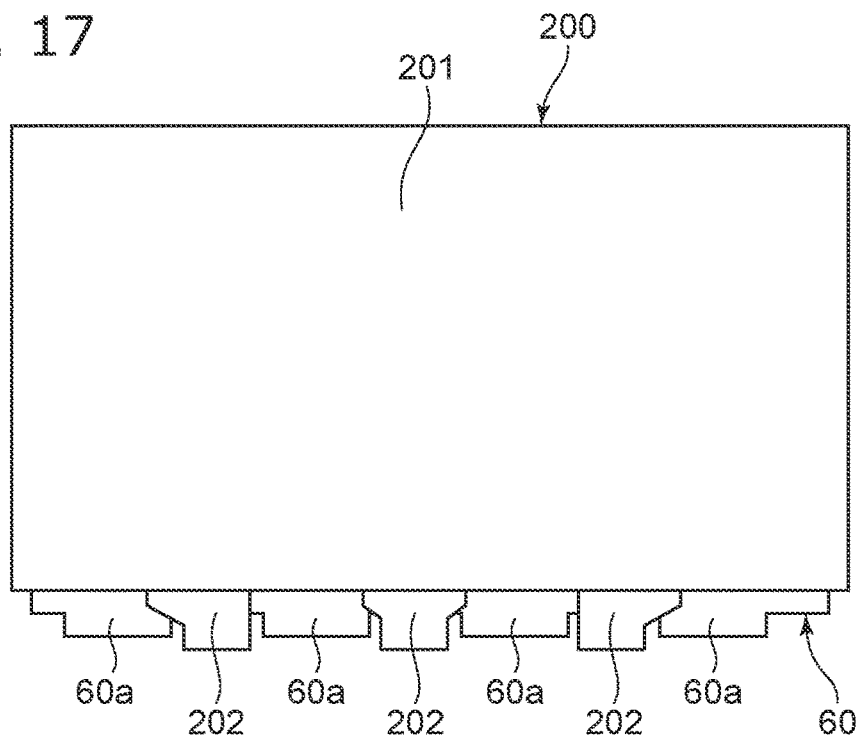
FIG. 17 is a schematic top view of a liquid crystal panel and a wiring substrate according to a seventh embodiment.

FIG. 17 is a schematic top view of a liquid crystal panel 200 and a wiring substrate 60 according to a seventh embodiment.

The liquid crystal panel 200 includes an external connection portion 202. The external connection portion 202 is electrically connected to an external circuit via a connector or the like, and power is supplied to the liquid crystal panel 200 through the external connection portion 202. With the liquid crystal panel 200 and the wiring substrate 60 overlapping each other, the external connection portion 202 of the liquid crystal panel 200 and an external connection portion 60a of the wiring substrate 60 are drawn out from the same side of a display device. In a plan view, the external connection portion 202 of the liquid crystal panel 200 and the external connection portion 60a of the wiring substrate 60 do not overlap each other. In this way, each of the external connection portion 202 and the external connection portion 60a can be easily bent, and electrical connection with the external circuit is facilitated.

Embodiments of the present invention have been described above with reference to specific examples. However, the present invention is not limited to these specific examples. All aspects that can be practiced by a person skilled in the art modifying the design as appropriate based on the above-described embodiments of the present invention are also included in the scope of the present invention, as long as they encompass the spirit of the present invention. In addition, in the spirit of the present invention, a person skilled in the art can conceive of various modified examples and alterations, and those modified examples and alterations will also fall within the scope of the present invention.

What is claimed is:

1. A planar light source comprising:
   a support member comprising a wiring substrate that comprises a conductive portion;
   a light guide member comprising a first surface facing the support member, a second surface located on a side opposite the first surface, and a hole open at a first surface side;
   a light source disposed in the hole of the light guide member and electrically connected to the conductive portion; and
   a first reinforcing member disposed on the support member and surrounding the light guide member in a plan view, the first reinforcing member comprising:
      a first portion and a second portion extending in a first direction and facing each other, and
      a third portion and a fourth portion extending in a second direction orthogonal to the first direction and facing each other; wherein:
   at least one of the first portion, the second portion, the third portion, and the fourth portion has light reflectivity to light emitted from the light source;

in the plan view, the light guide member is located between the first portion and the second portion in the second direction, and is located between the third portion and the fourth portion in the first direction;

the wiring substrate comprises an external connection portion extending in a direction from the third portion toward the fourth portion in the first direction, and electrically connected to the conductive portion; and the external connection portion is located closer to an outside than the fourth portion relative to a center of the wiring substrate.

2. The planar light source according to claim 1, wherein:
the support member comprises a base member configured to support the wiring substrate;
the wiring substrate is located between the base member and the light guide member; and
the first portion, the second portion, and the third portion of the first reinforcing member are disposed on the base member.

3. The planar light source according to claim 2, wherein:
the first portion, the second portion, and the third portion of the first reinforcing member and the wiring substrate are fixed onto the base member via a first adhesive member.

4. The planar light source according to claim 3, wherein:
the first adhesive member contains a light reflective substance.

5. A display device comprising:
the planar light source according to claim 1; and
a liquid crystal panel supported on the first reinforcing member and facing an upper surface of the planar light source.

6. The display device according to claim 5, further comprising:
a housing top plate overlapping an outer peripheral portion of an upper surface of the liquid crystal panel in a plan view; wherein:
at least a part of the upper surface of the liquid crystal panel is exposed from the housing top plate in the plan view.

7. The display device according to claim 5, further comprising:
a second reinforcing member located closer to an outside than the first reinforcing member relative to a center of the wiring substrate, and facing a lateral surface of the liquid crystal panel.

8. The planar light source according to claim 1, wherein:
the support member comprises a light reflective member disposed on the wiring substrate; and
the first portion, the second portion, the third portion, and the fourth portion are disposed on the light reflective member.

9. The planar light source according to claim 1, wherein:
the first portion, the second portion, the third portion, and the fourth portion are disposed on the wiring substrate.

10. The planar light source according to claim 1, wherein:
the first portion, the second portion, and the third portion have light reflectivity to the light emitted from the light source.

11. The planar light source according to claim 1, wherein:
the fourth portion has light reflectivity to the light emitted from the light source.

12. The planar light source according to claim 1, wherein:
the first portion, the second portion, the third portion, and the fourth portion are individual components.

13. The planar light source according to claim 1, wherein:
the fourth portion is a circuit board comprising a drive circuit configured to drive the light source.

14. The planar light source according to claim 1, wherein:
the fourth portion is fixed onto the wiring substrate via a second adhesive member.

15. The planar light source according to claim 1, wherein:
a maximum height of the first portion is greater than a maximum height of the light guide member.

16. The planar light source according to claim 1, wherein:
the first reinforcing member contains a resin.

17. The planar light source according to claim 1, wherein:
the first reinforcing member contains a metal.

18. The planar light source according to claim 1, wherein:
an inner lateral surface of the first reinforcing member facing the light guide member comprises an inclined surface expanding upward.

19. The planar light source according to claim 1, wherein:
the light guide member comprises a plurality of light guide portions separated from each other;
the light guide portions define corresponding holes; and
a plurality of light sources are disposed in the corresponding holes.

20. The planar light source according to claim 1, wherein:
the holes are through holes penetrating from the first surface to the second surface.

21. The planar light source according to claim 1, wherein:
the light source comprises:
a light-emitting element, and
a first light adjustment member forming an upper surface of the light source, the first light adjustment member being light-transmissive and light-reflective to the light emitted from the light-emitting element; and the planar light source further comprises:
a first light-transmissive member disposed between a lateral surface of the light source and the light guide member in the hole; and
a second light adjustment member disposed on the first light-transmissive member, wherein the second light adjustment member is light-transmissive and light-reflective to the light emitted from the light source.

22. The planar light source according to claim 1, wherein:
the first portion and the third portion overlap each other in the first direction and/or the second direction.

23. A planar light source comprising:
a support member comprising a wiring substrate that comprises a conductive portion;
a light guide member comprising a first surface facing the support member, a second surface located on a side opposite the first surface, and a hole open at a first surface side;
a light source disposed in the hole of the light guide member and electrically connected to the conductive portion, the light source comprising:
a light-emitting element, and
a first light adjustment member forming an upper surface of the light source, the first light adjustment member being light-transmissive and light-reflective to the light emitted from the light-emitting element; and a first reinforcing member disposed on the support member and surrounding the light guide member in a plan view, the first reinforcing member comprising:
  a first portion and a second portion extending in a first direction and facing each other, and
  a third portion and a fourth portion extending in a second direction orthogonal to the first direction and facing each other;
a first light-transmissive member disposed between a lateral surface of the light source and the light guide member in the hole; and
a second light adjustment member disposed on the first light-transmissive member, wherein the second light adjustment member is light-transmissive and light-reflective to the light emitted from the light source; wherein:
at least one of the first portion, the second portion, the third portion, and the fourth portion has light reflectivity to light emitted from the light source;
in the plan view, the light guide member is located between the first portion and the second portion in the second direction, and is located between the third portion and the fourth portion in the first direction.

* * * * *